(12) United States Patent
Kawasuji et al.

(10) Patent No.: US 10,371,469 B2
(45) Date of Patent: Aug. 6, 2019

(54) DEVICE FOR CONTROLLING TEMPERATURE OF COOLING WATER

(71) Applicant: Gigaphoton Inc., Tochigi (JP)

(72) Inventors: Yasufumi Kawasuji, Oyama (JP); Masazumi Komori, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 60 days.

(21) Appl. No.: 15/857,055

(22) Filed: Dec. 28, 2017

(65) Prior Publication Data

US 2018/0120041 A1    May 3, 2018

Related U.S. Application Data

(60) Division of application No. 14/279,248, filed on May 15, 2014, now Pat. No. 9,891,012, which is a
(Continued)

(30) Foreign Application Priority Data

Dec. 12, 2011 (JP) ................... 2011-271752
Sep. 26, 2012 (JP) ................... 2012-212763

(51) Int. Cl.
*F28F 27/00* (2006.01)
*F28F 27/02* (2006.01)
(Continued)

(52) U.S. Cl.
CPC .............. *F28F 27/02* (2013.01); *F28F 27/00* (2013.01); *G05D 23/1917* (2013.01);
(Continued)

(58) Field of Classification Search
CPC ......... G21K 1/062; H05G 2/008; F28F 27/00; F28F 27/02; F28F 2250/08; F01P 3/2207; F01P 3/2285; G05D 23/1917; B01D 3/101
(Continued)

(56) References Cited

U.S. PATENT DOCUMENTS 3,796,640 A * 3/1974 Boomer ................ B01D 3/101
                                                    202/205
4,577,594 A * 3/1986 Hayashi ................ F01P 3/2285
                                                    123/41.08
(Continued)

FOREIGN PATENT DOCUMENTS

JP    S62-202977 A    9/1987
JP    H04-203876 A    7/1992
(Continued)

OTHER PUBLICATIONS

An Office Action; "Notice of Reason for Rejection," issued by the Japanese Patent Office dated May 17, 2016, which corresponds to Japanese Patent Application No. 2012-212763 and is related to U.S. Appl. No. 14/279,248; with English language translation.
(Continued)

*Primary Examiner* — Davis D Hwu
(74) *Attorney, Agent, or Firm* — Studebaker & Brackett PC

(57) ABSTRACT

A device for controlling the temperature of cooling water includes a three-way valve having a first inlet, a second inlet, and an outlet; a first feed pipe; a second feed pipe; and a return pipe for connecting between an outlet of the temperature-control target and an inlet of the cooling water supply unit. The device also includes a return-side bypass pipe for connecting between the return pipe and the second inlet of the three-way valve; a pump provided on the second feed pipe for circulating the cooling water between the three-way
(Continued)

valve and the temperature-control target; and a temperature measuring unit for measuring a temperature of the cooling water flowing in the second feed pipe. In addition, the device includes a controller for controlling the three-way valve and the pump in accordance with a detection result of the temperature measuring unit.

11 Claims, 17 Drawing Sheets

Related U.S. Application Data continuation of application No. PCT/IB2012/002486, filed on Nov. 26, 2012.

(51) Int. Cl.
  *G05D 23/19* (2006.01)
  *H05G 2/00* (2006.01)
  *G21K 1/06* (2006.01)

(52) U.S. Cl.
  CPC .......... *H05G 2/008* (2013.01); *F28F 2250/08* (2013.01); *G21K 1/062* (2013.01)

(58) Field of Classification Search
  USPC ....................................................... 165/301
  See application file for complete search history.

(56) References Cited

U.S. PATENT DOCUMENTS

| | | | | |
|---|---|---|---|---|
| 4,669,246 | A | * | 6/1987 | Freeman ................. E04D 11/02 52/309.8 |
| 5,335,708 | A | | 8/1994 | Murakami et al. |
| 5,970,729 | A | | 10/1999 | Yamamoto et al. |
| 6,148,626 | A | | 11/2000 | Iwamoto |
| 6,673,482 | B2 | | 1/2004 | Imaseki et al. |
| 7,152,555 | B2 | * | 12/2006 | Langervik ............. F01P 3/2207 123/41.08 |
| 7,405,416 | B2 | | 7/2008 | Algots et al. |
| 7,641,349 | B1 | | 1/2010 | Chrobak et al. |
| 8,969,838 | B2 | | 3/2015 | Vaschenko et al. |
| 9,192,038 | B2 | | 11/2015 | Ishihara et al. |
| 2001/0003347 | A1 | | 6/2001 | Shimoda et al. |
| 2001/0037652 | A1 | | 11/2001 | Sasayama et al. |
| 2003/0068012 | A1 | | 4/2003 | Ahmad et al. |
| 2004/0068997 | A1 | | 4/2004 | Hirooka et al. |
| 2004/0251017 | A1 | | 12/2004 | Pillion et al. |
| 2006/0005554 | A1 | | 1/2006 | Okada |
| 2007/0178020 | A1 | | 8/2007 | Atlas et al. |
| 2007/0272155 | A1 | | 11/2007 | Nozawa et al. |
| 2007/0289732 | A1 | | 12/2007 | Pillion et al. |
| 2009/0090498 | A1 | | 4/2009 | Okada |
| 2010/0078160 | A1 | | 4/2010 | Novotny et al. |
| 2010/0236772 | A1 | | 9/2010 | Novotny et al. |
| 2010/0314094 | A1 | | 12/2010 | Hall |
| 2014/0060799 | A1 | | 3/2014 | Eckberg et al. |

FOREIGN PATENT DOCUMENTS

| | | |
|---|---|---|
| JP | H05-143169 A | 6/1993 |
| JP | H8-233423 A | 9/1996 |
| JP | H08-306989 A | 11/1996 |
| JP | H11-183005 A | 7/1999 |
| JP | 2004-028554 A | 1/2004 |
| JP | 2004-333010 A | 11/2004 |
| TW | 522214 B | 3/2003 |
| TW | 546465 B | 8/2003 |
| TW | 200746242 A | 12/2007 |
| WO | 2004/079805 A1 | 9/2004 |

OTHER PUBLICATIONS

An Office Action issued by the Taiwanese Patent Office dated Mar. 24, 2016, which corresponds to Taiwanese Patent Application No. 101146351 and is related to U.S. Appl. No. 14/279,248; with English language translation; 11pp.

International Preliminary Report on Patentability and Written Opinion issued in corresponding PCT Application No. PCT/IB2012/002486, dated Jun. 26, 2014.

An Office Action; "Notification of Reasons for Refusal," issued by the Japanese Patent Office dated Dec. 3, 2018, which corresponds to Japanese Patent Application No. 2017-248994 and is related to U.S. Appl. No. 15/857,055; with English Translation.

* cited by examiner

DEVICE FOR CONTROLLING TEMPERATURE OF COOLING WATER

CROSS-REFERENCE TO RELATED APPLICATIONS

This application is a divisional application of U.S. application Ser. No. 14/279,248 filed May 15, 2014, which is a continuation of International Application No. PCT/IB2012/002486 filed Nov. 26, 2012, which claims benefit of Japanese Patent Application No. 2011-271752 filed Dec. 12, 2011, and Japanese Patent Application No. 2012-212763 filed Sep. 26, 2012, the entire contents of which are incorporated herein by reference.

BACKGROUND

1. Technical Field

The present disclosure relates to a device for controlling a temperature of cooling water.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

A device for controlling a temperature of cooling water according to one aspect of the present disclosure may include a heat exchanger for carrying out heat exchange between primary cooling water and secondary cooling water, a tank for storing the secondary cooling water, an injection pipe for connecting between the tank and a secondary cooling water supply unit, a valve for controlling a flow rate of the secondary cooling water to be supplied into the tank from the secondary cooling water supply unit through the injection pipe, a fluid level detection unit for detecting an amount of the secondary cooling water stored in the tank, a first circulation pipe for connecting between the tank and a secondary cooling water inlet of the heat exchanger, a second circulation pipe for connecting between a secondary cooling water outlet of the heat exchanger and a secondary cooling water inlet of a temperature-control target, a third circulation pipe for connecting between the tank and a secondary cooling water outlet of the temperature-control target, a pump for circulating the secondary cooling water stored in the tank through the heat exchanger, the temperature-control target, and the tank, and a controller for controlling the valve and the pump in accordance with a detection result of the fluid level detection unit.

A device for controlling a temperature of cooling water according to another aspect of the present disclosure may include a heat exchanger for carrying out heat exchange between primary cooling water and secondary cooling water, a tank for storing the secondary cooling water, a first circulation pipe for connecting between the tank and a secondary cooling water inlet of the heat exchanger, a second circulation pipe for connecting between a secondary cooling water outlet of the heat exchanger and a secondary cooling water inlet of a temperature-control target, a third circulation pipe for connecting between the tank and a secondary cooling water outlet of the temperature-control target, a heater for heating the secondary cooling water stored in the tank, a temperature measuring unit for measuring a temperature of the secondary cooling water stored in the tank, a three-way valve having a first inlet, a second inlet, and an outlet, a feed pipe for connecting between an outlet of a primary cooling water supply unit and a primary cooling water inlet of the heat exchanger, a first return pipe for connecting a primary cooling water outlet of the heat exchanger and the first inlet of the three-way valve, a second return pipe for connecting between the outlet of the three-way valve and an inlet of the primary cooling water supply unit, a feed-side bypass pipe for connecting between the feed pipe and the second inlet of the three-way valve, and a controller for controlling the heater and the three-way valve in accordance with a detection result of the temperature measuring unit.

A device for controlling a temperature of cooling water according to yet another aspect of the present disclosure may include a three-way valve having a first inlet, a second inlet, and an outlet, a first feed pipe for connecting between an outlet of a cooling water supply unit and the first inlet of the three-way valve, a second feed pipe for connecting between the outlet of the three-way valve and an inlet of a temperature-control target, a return pipe for connecting between an outlet of the temperature-control target and an inlet of the cooling water supply unit, a return-side bypass pipe for connecting between the return pipe and the second inlet of the three-way valve, a pump provided on the second feed pipe for circulating the cooling water between the three-way valve and the temperature-control target, a temperature measuring unit for measuring a temperature of the cooling water flowing in the second feed pipe, and a controller for controlling the three-way valve and the pump in accordance with a detection result of the temperature measuring unit.

BRIEF DESCRIPTION OF THE DRAWINGS

Hereinafter, selected embodiments of the present disclosure will be described with reference to the accompanying drawings.

DETAILED DESCRIPTION

Figure 1:
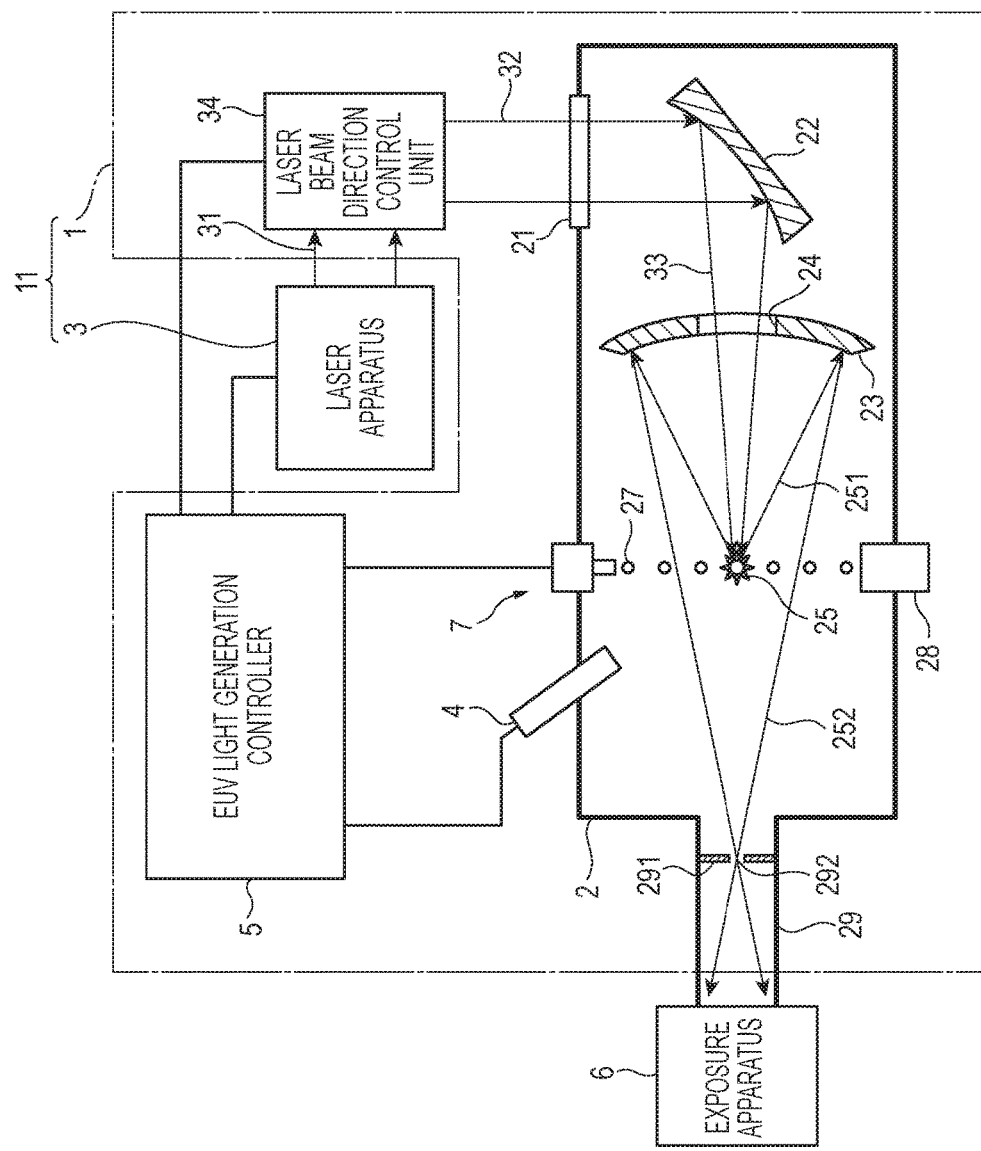
FIG. 1 schematically illustrates a configuration of an exemplary LPP type EUV light generation apparatus.

Hereinafter, selected embodiments of the present disclosure will be described in detail with reference to the accompanying drawings. The embodiments to be described below are merely illustrative in nature and do not limit the scope of the present disclosure. Further, configurations and operations described in each embodiment are not all essential in implementing the present disclosure. Note that like elements are referenced by like reference numerals and characters, and duplicate descriptions thereof will be omitted herein.

CONTENTS

1. Overview
2. Overview of EUV Light Generation System
2.1 Configuration
2.2 Operation
3. Embodiments of EUV Light Generation Apparatus
3.1 Terms
3.2 First Embodiment
3.2.1 Configuration
3.2.2 Operation
3.2.2.1 Temperature Control process in First Cooling Water Temperature Control Device
3.2.2.2 Temperature Control process in Second through Fifth Cooling Water Temperature Control Devices
3.2.2.2.1 Injection Process of Secondary Cooling Water
3.2.2.2.2 Temperature Control process in Second through Fifth Cooling Water Temperature Control Devices
3.3 Second Embodiment
3.3.1 Configuration 1. Overview In one or more embodiment(s) of the present disclosure, a cooling water temperature control device may be provided to cool a temperature-control target using secondary cooling water whose temperature has been adjusted using primary cooling water. The cooling water temperature control device may include a heat exchanger, a tank for storing secondary cooling water, an injection pipe for connecting between the tank and a secondary cooling water supply unit, a valve for controlling a flow rate of the secondary cooling water flowing in the injection pipe, and a fluid level detection unit for detecting a fluid level of the secondary cooling water stored in the tank. The cooling water temperature control device may further include a first circulation pipe, a second circulation pipe, a third circulation pipe, and a pump for circulating the secondary cooling water through the heat exchanger, the temperature-control target, and the tank.

The aforementioned cooling water temperature control device may further include a controller, and the controller may be configured to carry out control as follows. The controller may first control the valve in accordance with a detection result of the fluid level detection unit to supply the secondary cooling water into the tank to an upper limit amount in a state where the pump is stopped. Then, the controller may close the valve and drive the pump to circulate the secondary cooling water. Thereafter, when the controller determines that the fluid level of the secondary cooling water in the tank has reached the lower limit, the controller may stop circulation of the secondary cooling water. Then, the controller may carry out the above-described control until the first circulation pipe, the second circulation pipe, the third circulation pipe, the heat exchanger, the temperature-control target, and the tank are filled with the secondary cooling water.

With the above-described configuration and operation, the first circulation pipe, the second circulation pipe, the third circulation pipe, the heat exchanger, the temperature-control target, and the tank may be filled with the secondary cooling water without using a large-volume tank.

In another embodiment of the present disclosure, a cooling water temperature control device may include a heat exchanger, a tank for storing secondary cooling water, and first through third circulation pipes for circulating the secondary cooling water through the heat exchanger, the temperature-control target, and the tank. The cooling water temperature control device may further include a heater for heating the secondary cooling water stored in the tank, a temperature measuring unit for measuring the temperature of the secondary cooling water flowing in the second circulation pipe, and a three-way valve. Further, the cooling water temperature control device may include a feed pipe for connecting between an outlet of a primary cooling water supply unit and a primary cooling water inlet of the heat exchanger, a first return pipe for connecting between a primary cooling water outlet of the heat exchanger and a first inlet of the three-way valve, a second return pipe for connecting between an outlet of the three-way valve and an inlet of the primary cooling water supply unit, and a feed-side bypass pipe for connecting between the feed pipe and a second inlet of the three-way valve.

The aforementioned cooling water temperature control device may further include a controller, and the controller may be configured to carry out control as follows. The controller may first heat the secondary cooling water with the heater, and then carry out heat exchange between the heated secondary cooling water and the primary cooling water. Here, the controller may control the three-way valve in accordance with a measurement result of the temperature measuring unit to adjust an amount of the primary cooling water to be supplied from the primary cooling water supply unit to the heat exchanger. More specifically, when the temperature of the secondary cooling water is to be raised, the controller may reduce the amount of primary cooling water to flow into the heat exchanger and increase the amount of primary cooling water to flow into the three-way valve, to thereby lower cooling performance of the heat exchanger. On the other hand, when the temperature of the secondary cooling water is to be lowered, the controller may increase the amount of primary cooling water to flow into the heat exchanger and reduce the amount of primary cooling water to flow into the three-way valve, to thereby raise cooling performance of the heat exchanger.

With the above-described configuration and operation, cooling performance of the heat exchanger may be fine-tuned by adjusting the amount of primary cooling water in the heat exchanger. Accordingly, the temperature of the secondary cooling water may be fine-tuned using the heat exchanger, and a time required to bring the temperature of the secondary cooling water to a desired temperature may be reduced. Thus, a time it takes for the temperature of the temperature-control target portion to stabilize may be reduced.

In yet another embodiment of the present disclosure, a cooling water temperature control device may include a three-way valve, a first feed pipe for connecting between an outlet of a cooling water supply unit and a first inlet of the three-way valve, a second feed pipe for connecting between an outlet of the three-way valve and an inlet of a temperature-control target, a return pipe for connecting between an outlet of the temperature-control target and an inlet of the cooling water supply unit, and a return-side bypass pipe for connecting between the return pipe and a second inlet of the three-way valve. The cooling water temperature control device may further include a pump for circulating the cooling water through the three-way valve and the temperature-control target, and a temperature measuring unit for measuring the temperature of the cooling water flowing in the second feed pipe.

The aforementioned cooling water temperature control device may further include a controller, and the controller may be configured to carry out control as follows. The controller may control the three-way valve in accordance with a measurement result of the temperature measuring unit to adjust an amount of the cooling water to be supplied from the cooling water supply unit to the temperature-control target. More specifically, when the temperature of the temperature-control target portion is to be raised, the controller may reduce the amount of cooling water to be newly supplied from the cooling water supply unit to the temperature-control target, and increase the amount of cooling water to be resupplied to the temperature-control target portion after being used to control the temperature of the temperature-control target portion, to thereby lower cooling performance by the cooling water. On the other hand, when the temperature of the temperature-control target portion is to be lowered, the controller may increase the amount of cooling water to be newly supplied from the cooling water supply unit to the temperature-control target portion and decrease the amount of cooling water to be resupplied to the temperature-control target portion, to thereby raise cooling performance by the cooling water.

With the above-described configuration and operation, cooling performance by the cooling water may be fine-tuned by adjusting the amount of cooling water newly supplied and/or resupplied to the temperature-control target portion, and a time it takes for the temperature of the temperature-control target portion to stabilize may be reduced. Further, as compared to a configuration in which a chiller is used to cool the temperature-control target portion, the cooling water temperature control device may be reduced in size.

In yet another embodiment of the present disclosure, a cooling water temperature control device may include an inert gas introduction unit for introducing inert gas into secondary cooling water stored in a tank.

Accordingly, the amount of oxygen dissolved in the secondary cooling water may be reduced by introducing inert gas into the secondary cooling water. Thus, a heat exchanger, a temperature-control target portion, or metal portions of the tank, a first circulation pipe, a second circulation pipe, and/or a third circulation pipe may be prevented from corroding.

2. Overview of EUV Light Generation System 2.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 7. The chamber 2 may be sealed airtight. For example, the target supply device 7 may be mounted onto the chamber 2 to penetrate a wall of the chamber 2. A target material to be supplied by the target supply device 7 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture may be provided in the connection part 29. The wall 291 may be positioned such that the second focus of the EUV collector mirror 23 lies in the aperture formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

2.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 7 may be configured to output the target(s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 31 travels, and the position at which the pulse laser beam 33 is focused. It will be appreciated that the various controls mentioned above are merely examples, and other controls may be added as necessary.

3. Embodiments of EUV Light Generation Apparatus

3.1 Terms

Hereinafter, industrial cooling water will be referred to as process cooling water (PCW). Water having lower purity than super pure water and used to control the temperature of a temperature-control target will be referred to as ordinary water. PCW may be used as primary cooling water to control the temperature of the temperature-control target portion. Super pure water or ordinary water may be used as secondary cooling water whose temperature is adjusted through heat exchange with the primary cooling water. PCW may be referred to as the primary cooling water in some cases. At least one of super pure water and ordinary water may be referred to as the secondary cooling water in some cases.

3.2 First Embodiment

3.2.1 Configuration

Figure 2:
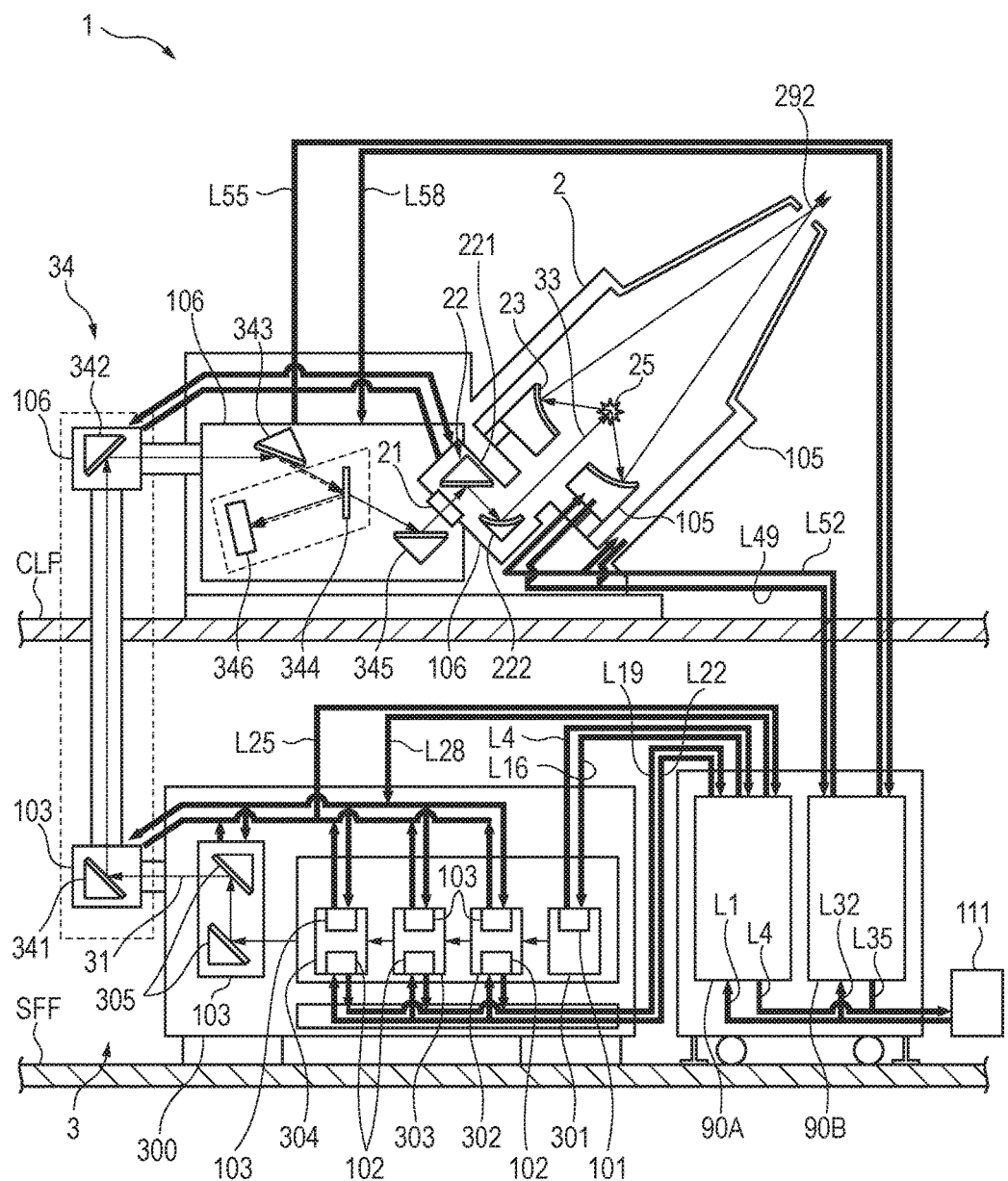
FIG. 2 schematically illustrates an exemplary configuration of an EUV light generation apparatus which includes a device for controlling a temperature of cooling water according to a first embodiment of the present disclosure.
Figure 3:
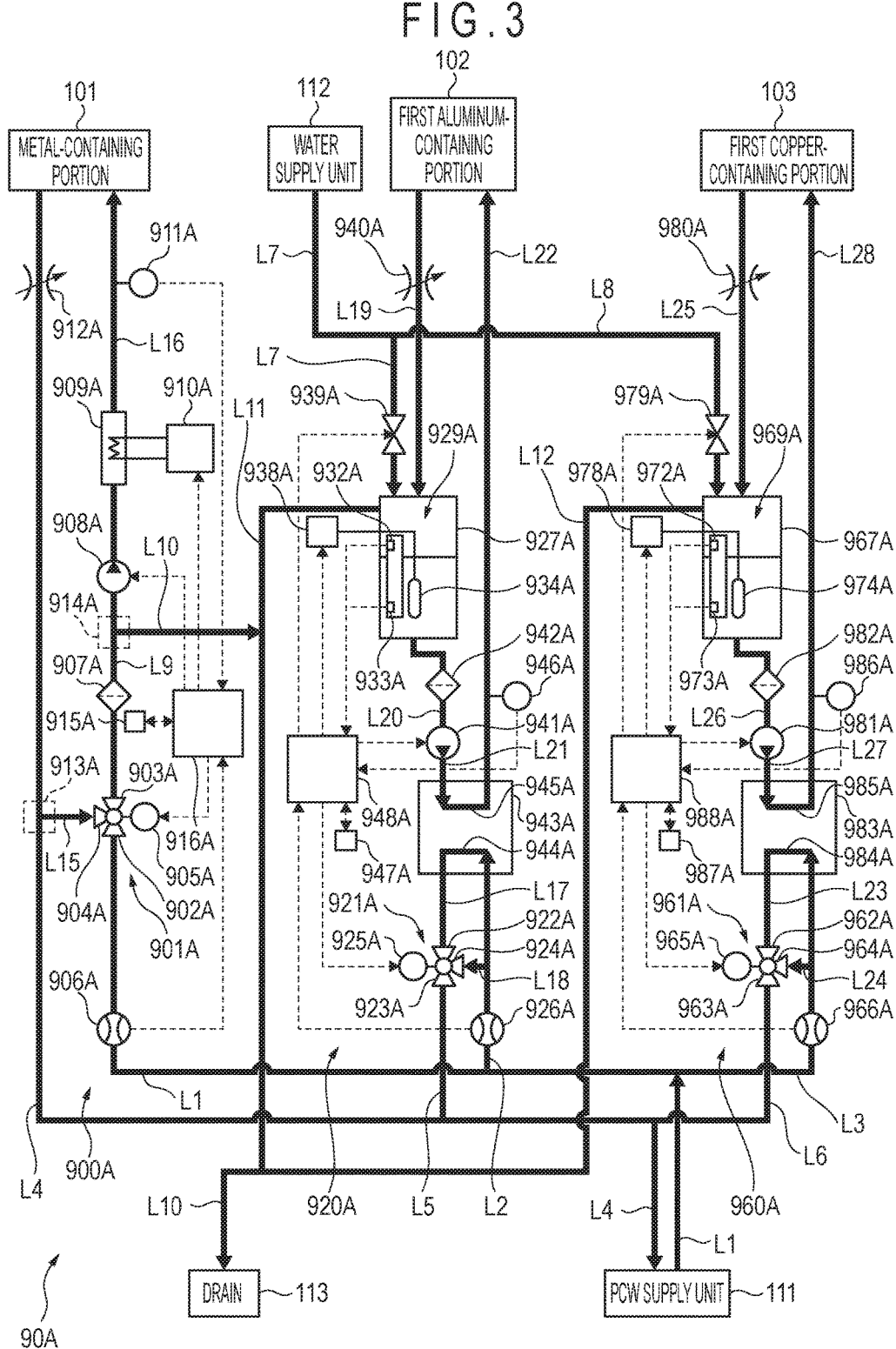
FIG. 3 schematically illustrates an exemplary configuration of a first temperature control system.
Figure 4:
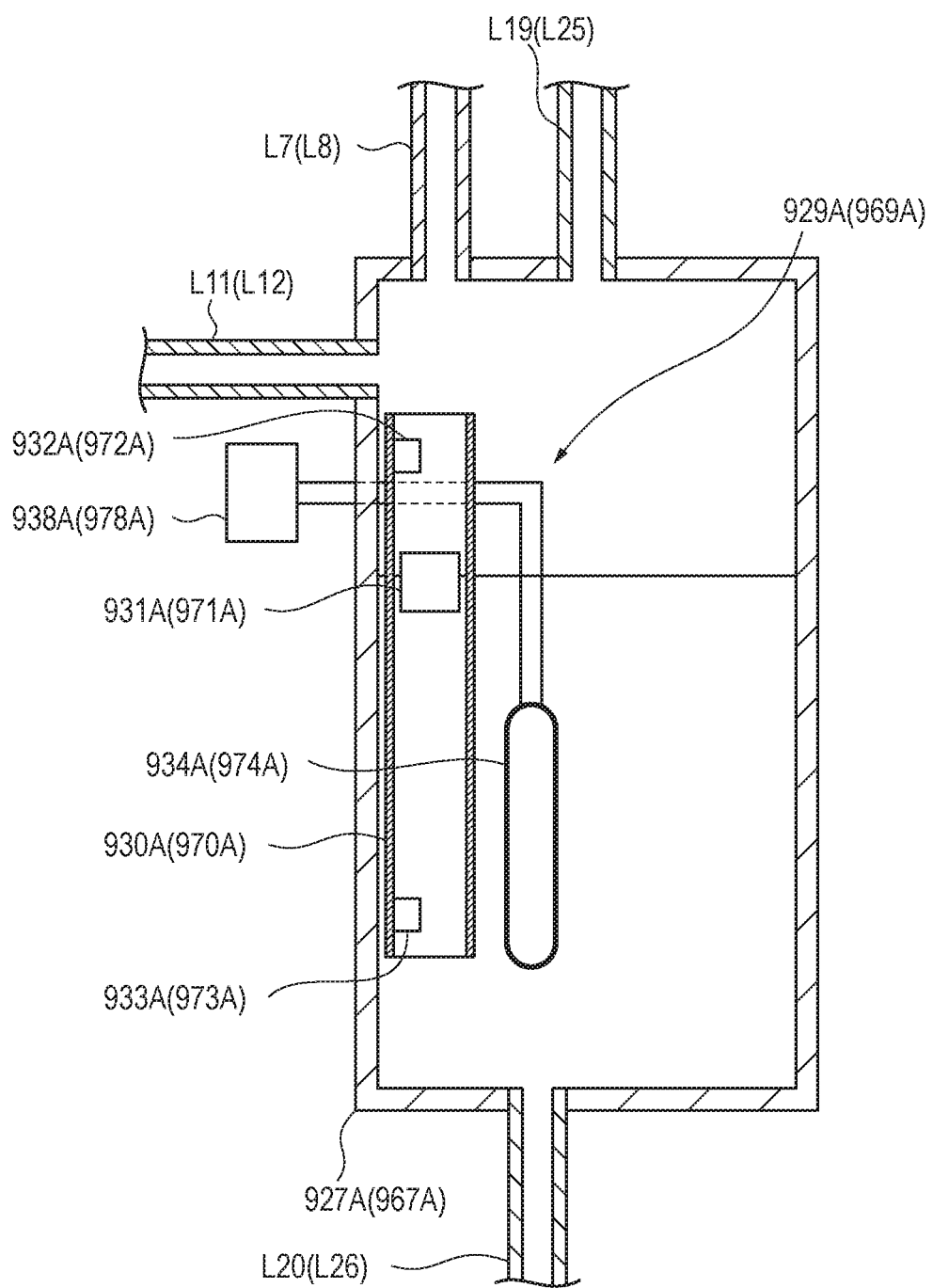
FIG. 4 schematically illustrates an exemplary configuration of a circulation adjuster of a cooling water temperature control device in the first temperature control system.
Figure 5:
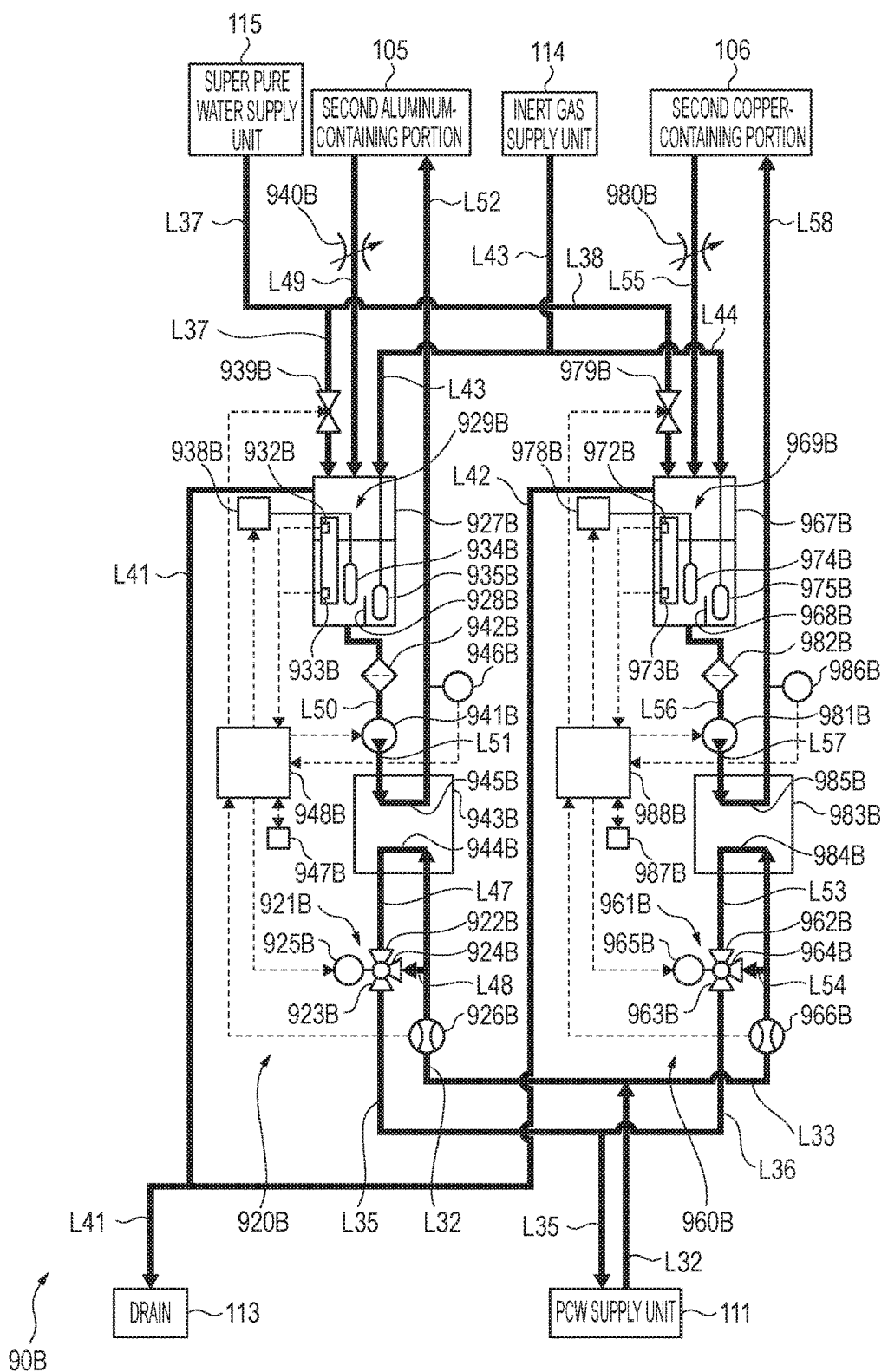
FIG. 5 schematically illustrates an exemplary configuration of a second temperature control system.
Figure 6:
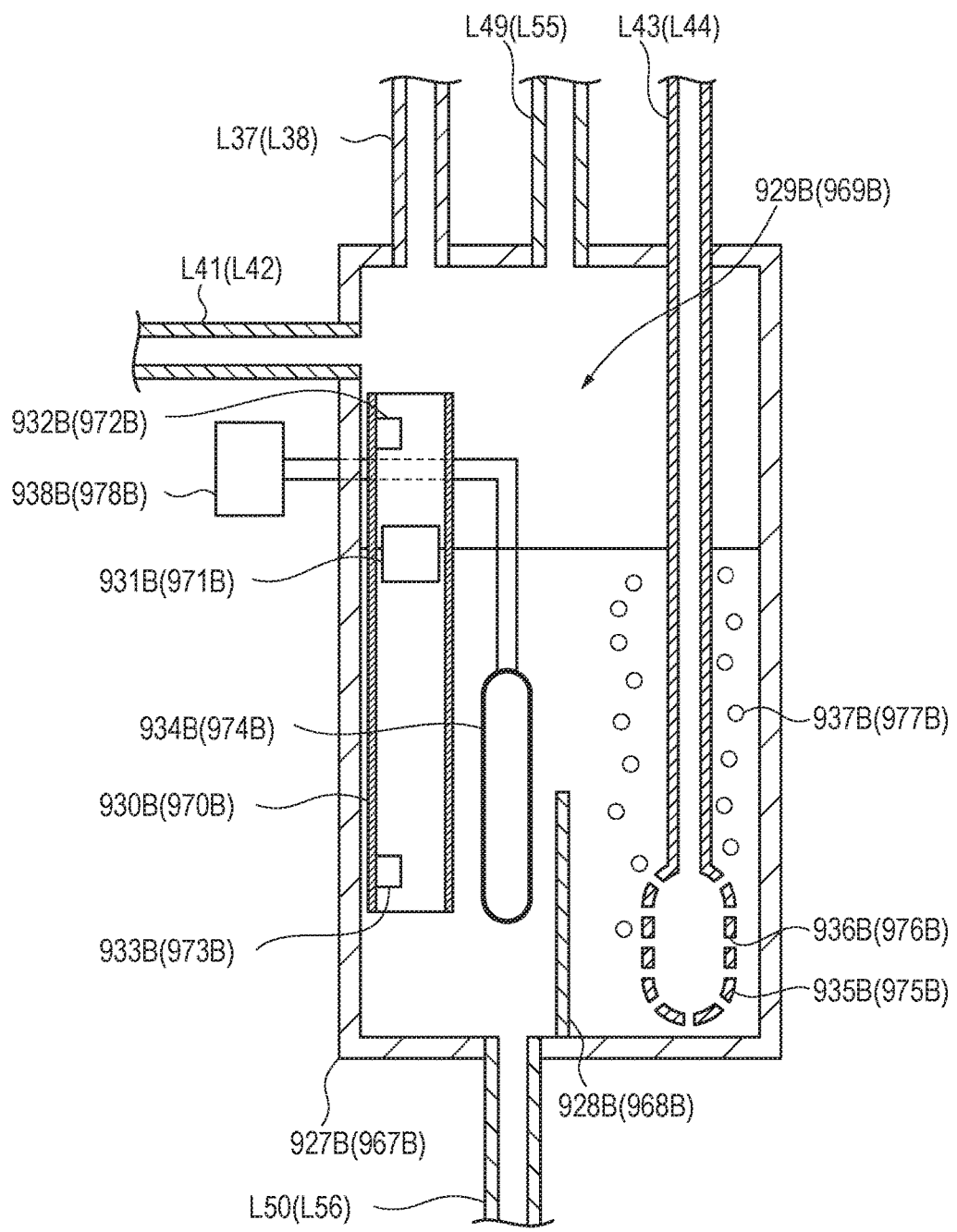
FIG. 6 schematically illustrates an exemplary configuration of a circulation adjuster of a cooling water temperature control device in the second temperature control system.

FIG. 2 schematically illustrates an exemplary configuration of an EUV light generation apparatus including a cooling water temperature control device according to a first embodiment of the present disclosure. FIG. 3 schematically illustrates an exemplary configuration of a first temperature control system of the first embodiment. FIG. 4 schematically illustrates an exemplary configuration of a circulation adjuster of a cooling water temperature control device in the first temperature control system. FIG. 5 schematically illustrates an exemplary configuration of a second temperature control system according to the first embodiment. FIG. 6 schematically illustrates an exemplary configuration of a circulation adjuster of a cooling water temperature control device in the second temperature control system.

The laser apparatus 3 may be installed in a sub-fab floor SFF, as shown in FIG. 2. The sub-fab floor SFF may be located downstairs from a clean room floor CLF, which will be described later. The laser apparatus 3 may include a housing 300. A master oscillator 301, a preamplifier 302, a first main amplifier 303, a second main amplifier 304, and an optical system 305 may be provided inside the housing 300. Although the optical system 305 shown in FIG. 2 includes two mirrors, the number of optical elements in the optical system 305 may be one or three or more.

The master oscillator 301 may include a metal-containing portion 101 serving as a temperature-control target portion. The metal-containing portion 101 may be a discharge unit (not separately shown), a power supply unit (not separately shown), or the like and may require high-precision temperature control. Each of the preamplifier 302, the first main amplifier 303, and the second main amplifier 304 may include a first aluminum-containing portion 102 serving as a temperature-control target. The first aluminum-containing portion 102 may contain aluminum as a primary material and may require high-precision temperature control. Each of the preamplifier 302, the first main amplifier 303, the second main amplifier 304, and the optical system 305 may include a first copper-containing portion 103 serving as a temperature-control target. The first copper-containing portion 103 may contain copper as a primary material and may require high-precision temperature control. The first copper-containing portions 103 may include holders for mirrors included in the pre-amplifier 302, the first main amplifier 303, the second main amplifier 304, and the optical system 305.

The EUV light generation apparatus 1 may include the laser beam direction control unit 34, the laser beam focusing optical system 22, the chamber 2, a first temperature control system 90A, and a second temperature control system 90B.

The laser beam direction control unit 34 may be configured to guide the pulse laser beam 31 outputted from the laser apparatus 3 in the sub-fab floor SFF to the laser beam focusing optical system 22 provided in the clean room floor CLF. The laser beam direction control unit 34 may include a first optical element 341 provided in the sub-fab floor SFF, a second optical element 342, a third optical element 343, a beam splitter 344, a fourth optical element 345, and a sensor 346 that are provided in the clean room floor CLF. The laser beam direction control unit 34 may include the first copper-containing portion 103 and a second copper-containing portion 106 serving as a temperature-control target. The second copper-containing portion 106 may contain copper as a primary material and may require high-precision temperature control. The first copper-containing portion 103 in the laser beam direction control unit 34 may be a holder for the first optical element 341. The second copper-containing portion 106 may be a holder for each of the second optical element 342, the third optical element 343, the beam splitter 344, the fourth optical element 345, and the sensor 346.

The laser beam focusing optical system 22 may include an optical element 221 and a focusing optical element 222. The window 21 and the laser beam focusing optical system 22 may be held by the second copper-containing portion 106. The chamber 2 may include a second aluminum-containing portion 105 serving as a temperature-control target portion. The second aluminum-containing portion 105 may contain aluminum as a primary material and may require high-precision temperature control. The second aluminum-containing portion 105 may be a chamber vessel of the chamber 2 and/or a holder for the EUV collector mirror 23.

When the temperature of the metal-containing portion 101, the first aluminum-containing portion 102, the first copper-containing portion 103, the second aluminum-containing portion 105, and/or the second copper-containing portion 106 changes, the beam axis and/or the beam profile of the pulse laser beam may change. Thus, EUV light may not be generated properly. For example, when the temperature of a holder serving as a first copper-containing portion 103 changes, the holder may deform. Accordingly, the posture of an output mirror or mirrors in the optical system 305 may change in accordance with the deformation. When the posture of the output mirror or the mirrors in the optical system 305 changes, the beam axis of the pulse laser beam may change, and thus the pulse laser beam may not reach the plasma generation region 25. As a countermeasure, the temperature of each of the metal-containing portion 101, the first aluminum-containing portion 102, the first copper-containing 103, the second aluminum-containing portion 105, and the second copper-containing portion 106 may be controlled.

The first and second temperature control systems 90A and 90B may be provided in the sub-fab floor SFF. The first temperature control system 90A may be configured to control the temperature of each of the metal-containing portion 101, the first aluminum-containing portion 102, and the first copper-containing portion 103. The second temperature control system 90B may be configured to control the temperature of each of the second aluminum-containing portion 105 and the second copper-containing portion 106.

The first temperature control system 90A may be connected to a PCW supply unit 111 serving as a cooling water supply unit, an ordinary water supply unit 112 serving as a secondary cooling water supply unit, and a drain 113, as shown in FIG. 3. Further, the first temperature control system 90A may be connected to the metal-containing portion 101, the first aluminum-containing portion(s) 102, and the first copper-containing portion(s) 103. The first temperature control system 90A may include a first cooling water temperature control device 900A, a second cooling water temperature control device 920A, and a third cooling water temperature control device 960A. The first cooling water temperature control device 900A may be connected to the metal-containing portion 101, the second cooling water temperature control device 920A may be connected to the first aluminum-containing portion 102, and the third cooling water temperature control device 960A may be connected to the first copper-containing portion 103.

An outlet of the PCW supply unit 111 may be connected to a first inlet 902A of a three-way valve 901A of the first cooling water temperature control device 900A through a pipe L1 serving as a feed pipe. The outlet of the PCW supply unit 111 may also be connected to an inlet of a heat exchanger 943A of the second cooling water temperature control device 920A through a pipe L2 serving as a feed pipe. The pipe L2 may branch off from the pipe L1. The outlet of the PCW supply unit 111 may also be connected to an inlet of a heat exchanger 983A of the third cooling water temperature control device 960A through a pipe L3 serving as a feed pipe. The pipe L3 may branch off from the pipe L1. An inlet of the PCW supply unit 111 may be connected to an outlet of the metal-containing portion 101 through a pipe L4 serving as a return pipe. The inlet of the PCW supply unit 111 may also be connected to an outlet of the heat exchanger 943A through a pipe L5 serving as a return pipe. The pipe L5 may branch off from the pipe L4. The inlet of the PCW supply unit 111 may also be connected to an outlet of the heat exchanger 983A through a pipe L6 serving as a return pipe. The pipe L6 may branch off from the pipe L4.

The PCW supply unit 111 may be configured to supply PCW to the first, second, and third cooling water temperature control devices 900A, 920A, and 960A, and also to a fourth cooling water temperature control device 920B and a fifth cooling water temperature control device 960B, which will be described later. The temperature of PCW to be supplied to the first through fifth cooling water temperature control devices 900A, 920A, 960A, 920B, and 960B may be higher than the temperature of ordinary water and/or super pure water. More specifically, the temperature of PCW may be in a range from 10° C. to 21° C. inclusive. Further, the PCW supply unit 111 may be configured to collect PCW used in the first through fifth cooling water temperature control devices 900A, 920A, 960A, 920B, and 960B, and readjust the temperature of the collected PCW to fall within a range from 10° C. to 21° C. inclusive. Thereafter, the PCW supply unit 111 may resupply the temperature-adjusted PCW to the first through fifth cooling water temperature control devices 900A, 920A, 960A, 920B, and 960B.

The ordinary water supply unit 112 may be connected to a tank 927A of the second cooling water temperature control device 920A through a pipe L7 serving as an injection pipe. The ordinary water supply unit 112 may also be connected to a tank 967A of the third cooling water temperature control device 960A through a pipe L8 serving as an injection pipe. The pipe L8 may branch off from the pipe L7.

The ordinary water supply unit 112 may be configured to supply ordinary water used as the secondary cooling water to the tanks 927A and 967A. Ordinary water supplied from the ordinary water supply unit 112 may include an additive for suppressing generation of rust of aluminum and/or copper or generation of an alga.

The drain 113 may be connected to a pipe L9 serving as a return pipe through a pipe L10. The pipe L9 may connect between an outlet 903A of the three-way valve 901A and an inlet of a pump 908A. The drain 113 may also be connected to a side surface of the tank 927A and a side surface of the tank 967A through a pipe L11 and a pipe L12, respectively. Each of the pipes L11 and L12 may branch off from the pipe L10. The drain 113 may collect PCW or ordinary water that are not used in the first through third cooling water temperature control devices 900A, 920A, and 960A and discharge the collected PCW or ordinary water.

PCW may be used as the cooling water in the first cooling water temperature control device 900A. The first cooling water temperature control device 900A may be configured to adjust the temperature of the cooling water to control the temperature of the metal-containing portion 101 using the temperature-adjusted cooling water. For example, the first cooling water temperature control device 900A may be configured to adjust the temperature of the cooling water supplied at a temperature in a range from 10° C. and 21° C. inclusive to 25° C. The first cooling water temperature control device 900A may then use the temperature-adjusted cooling water at 25° C. to control the temperature of the metal-containing portion 101.

The first cooling water temperature control device 900A may include the three-way valve 901A, a three-way valve controller 905A, a flowmeter 906A, a filter 907A, the pump 908A, a heater 909A, a heater power supply 910A, a temperature sensor 911A, a butterfly valve 912A, a first buffer tank 913A, a second buffer tank 914A, a timer 915A, and a controller 916A. The controller 916A may be a sequencer, a programmable controller, or a computer connected to an appropriate I/O device. A controller 948A, a controller 988A, a controller 948B, and a controller 988B to be described later may be configured similarly.

The three-way valve 901A may include the first inlet 902A, the outlet 903A, and a second inlet 904A. The first inlet 902A and the outlet 903A may be connected to the outlet of the PCW supply unit 111 and the inlet of the pump 908A, respectively, as described above. The second inlet 904A may be connected to the pipe L4 through a pipe L15 serving as a return-side bypass pipe. The three-way valve controller 905A may be connected to the controller 916A through a signal line. The three-way valve controller 905A may control the three-way valve 901A in accordance with a signal from the controller 916A to adjust a ratio of a flow rate of the cooling water flowing into the first inlet 902A to a flow rate of the cooling water flowing into the second inlet 904A. Then, the cooling water flowing out through the outlet 903A may be supplied to the pump 908A.

The flowmeter 906A may be provided on the pipe L1 upstream from the three-way valve 901A. The flowmeter 906A may be connected to the controller 916A through a signal line. The flowmeter 906A may detect a flow rate of the cooling water flowing into the three-way valve 901A through the pipe L1, and send a signal corresponding to a detected flow rate to the controller 916A. The filter 907A may be provided on the pipe L9 upstream from a location where the pipe L10 branches off from the pipe L9.

An outlet of the pump 908A may be connected to the inlet of the metal-containing portion 101 through a pipe L16 serving as a feed pipe. The pump 908A may be connected to the controller 916A through a signal line. The pump 908A may be configured to adjust the flow rate of the cooling water flowing in the pipe L16 in accordance with a signal from the controller 916A. The heater 909A may be provided on the pipe L16. The heater 909A may be connected to the heater power supply 910A. The heater power supply 910A may be connected to the controller 916A through a signal line. The heater power supply 910A may supply power to the heater 909A in accordance with a signal from the controller 916A. When the heater 909A is supplied with power, the heater 909A may generate heat, and thus the temperature of the cooling water flowing in the pipe L16 may rise.

The temperature sensor 911A may be provided on the pipe L16 downstream from the heater 909A. The temperature sensor 911A may be connected to the controller 916A through a signal line. The temperature sensor 911A may detect the temperature of the cooling water flowing through the pipe L16, and send a signal corresponding to a detected temperature to the controller 916A.

The butterfly valve 912A may be provided on the pipe L4 upstream from a location where the pipe L15 branches off from the pipe L4. Even if the cooling water leaks from the clean room floor CLF to the sub-fab floor SFF, by adjusting an opening of the butterfly valve 912A, generation of bubbles may be suppressed.

The first buffer tank 913A may be provided at a location where the pipe L15 branches off from the pipe L4. When the amount of cooling water flowing from the metal-containing portion 101 is equal to or less than a predetermined amount, the first buffer tank 913A may allow substantially the entire cooling water flowing thereinto to flow toward the three-way valve 901A. When the amount of cooling water flowing from the metal-containing portion 101 exceeds a predetermined amount, the first buffer tank 913A may allow the predetermined amount of cooling water to flow toward the three-way valve 901A and the remaining portion of the cooling water to flow toward the PCW supply unit 111.

The second buffer tank 914A may be provided at a location where the pipe L10 branches off from the pipe L9. The second buffer tank 914A may allow a predetermined amount of cooling water flowing thereinto from the filter 907A to flow toward the pump 908A and the remaining portion of the cooling water to flow toward the drain 113. Here, the aforementioned predetermined amount for the first buffer tank 913A may be the same as or different from the aforementioned predetermined amount for the second buffer tank 914A.

The timer 915A may be connected to the controller 916A through a signal line to send a signal indicative of an elapsed time to the controller 916A. The controller 916A may control the three-way valve controller 905A, the pump 908A, and the heater power supply 910A in accordance with signals from the flowmeter 906A, the temperature sensor 911A, and the timer 915A.

PCW may be used as the primary cooling water and ordinary water may be used as the secondary cooling water in each of the second and third cooling water temperature control devices 920A and 960A. In each of the second and third cooling water temperature control devices 920A and 960A, the temperature of the secondary cooling water may be adjusted using the primary cooling water, and the temperature of each of the first aluminum-containing portion 102 and the first copper-containing portion 103 may be controlled using the temperature-adjusted secondary cooling water. For example, the temperature of the secondary cooling water may be adjusted to 25° C. using the primary cooling water at a temperature in a range from 10° C. and 21° C. inclusive. Then, the temperature-adjusted secondary cooling water at 25° C. may be used to control the temperature of each of the first aluminum-containing portion 102 and the first copper-containing portion 103.

The second cooling water temperature control device 920A may include a three-way valve 921A, a three-way valve controller 925A, a flowmeter 926A, the tank 927A, a circulation adjuster 929A, a heater power supply 938A, a valve 939A, a butterfly valve 940A, a pump 941A, a filter 942A, a heat exchanger 943A, a temperature sensor 946A, a timer 947A, and the controller 948A. The circulation adjuster 929A may be provided inside the tank 927A.

The three-way valve 921A may include a first inlet 922A, an outlet 923A, and a second inlet 924A. The first inlet 922A may be connected to an outlet of a primary-side cooling part 944A of the heat exchanger 943A through a pipe L17 serving as a return pipe. The outlet 923A may be connected to the inlet of the PCW supply unit 111 through the pipes L4 and L5. The second inlet 924A may be connected to the pipe L2 through a pipe L18 serving as a feed-side bypass pipe. The three-way valve controller 925A may be connected to the controller 948A. The three-way valve controller 925A may control the three-way valve 921A in accordance with a signal from the controller 948A to adjust the amount of primary cooling water supplied to the primary-side cooling part 944A. The flowmeter 926A may be provided on the pipe L2 upstream from a location where the pipe L18 branches off from the pipe L2. The flowmeter 926A may detect a flow rate of the primary cooling water flowing in the pipe L2, and send a signal corresponding to a detected flow rate to the controller 948A.

The tank 927A may be box-shaped, as shown in FIGS. 3 and 4. The tank 927A may be connected to an outlet of the first aluminum-containing portion 102 through a pipe L19 serving as a circulation pipe. With this configuration, the secondary cooling water that has been used to control the temperature of the first aluminum-containing portion 102 may flow into the tank 927A. The tank 927A may also be connected to the ordinary water supply unit 112 through the pipe L7. This configuration may allow the secondary cooling water supplied from the ordinary water supply unit 112 to flow into the tank 927A. The pipe L11 may be connected to the side surface of the tank 927A at the vicinity of the upper end thereof to connect the tank 927A to the drain 113 through the pipe L11. A pipe L20 serving as a circulation pipe may be connected to the bottom of the tank 927A to connect the tank 927A to an inlet of the pump 941A through the pipe L20.

With reference to FIGS. 3 and 4, the circulation adjuster 929A may include a cylinder 930A, a float 931A, an upper limit switch 932A serving as a fluid level detection unit, a lower limit switch 933A serving as a fluid level detection unit, and a heater 934A. The cylinder 930A may be provided in the tank 927A toward a side surface thereof. The cylinder 930A may have a slit or an opening (not separately shown) formed therein so that secondary cooling water in the tank 927A may flow into the cylinder 930A.

The float 931A may be provided in the cylinder 930A. The float 931A may be formed of a material that floats on the secondary cooling water. The float 931A may be configured to move vertically inside the cylinder 930A in accordance with a change in the fluid level of the secondary cooling water in the cylinder 930A. The upper limit switch 932A may be provided in the cylinder 930A toward the upper end thereof. The lower limit switch 933A may be provided in the cylinder 930A toward the lower end thereof. Each of the upper limit switch 932A and the lower limit switch 933A may be connected to the controller 948A. Each of the upper limit switch 932A and the lower limit switch 933A may be configured to detect the float 931A coming into in contact thereto and send a signal indicative of the detection to the controller 948A. Alternatively, the float 931A may be substituted with a sensor configured to measure the distance from the sensor to a fluid level and send a signal corresponding to a measurement result to the controller 948A. In this case, the upper limit switch 932A and the lower limit switch 933A do not need to be provided.

The heater 934A may be an immersion heater. The heater 934A may be provided in the tank 927A and connected to the heater power supply 938A. The heater 934A may be disposed such that at least a part thereof is located below the lower limit switch 933A. The heater power supply 938A may be connected to the controller 948A. The heater power supply 938A may supply power to the heater 934A in accordance with a signal from the controller 948A. The valve 939A may be provided on the pipe L7 downstream from a location where the pipe L8 branches off from the pipe L7. The valve 939A may be connected to the controller 948A. The valve 939A may be switched under the control of the controller 948A. The butterfly valve 940A may be provided on the pipe L19.

An outlet of the pump 941A may be connected to an inlet of a secondary-side cooling part 945A of the heat exchanger 943A through a pipe L21 serving as a circulation pipe. The pump 941A may be configured to adjust the flow rate of the secondary cooling water flowing in the pipe L21 in accordance with a signal from the controller 948A. The filter 942A may be provided on the pipe L20.

The heat exchanger 943A may be configured to adjust the temperature of the secondary cooling water using the primary cooling water, and the temperature-adjusted secondary cooling water may be used to control the temperature of the first aluminum-containing portion 102. The heat exchanger 943A may be a plate-type heat exchanger in which water is used as the primary cooling water and the secondary cooling water. The heat exchanger 943A may include the primary-side cooling part 944A to circulate the primary cooling water and the secondary-side cooling part 945A to circulate the secondary cooling water.

The primary-side cooling part 944A may be provided to be in contact with the secondary-side cooling part 945A or may not be in contact with the secondary-side cooling part 945A. The inlet of the primary-side cooling part 944A may be connected to the outlet of the PCW supply unit 111 through the pipe L2 and the pipe L1. The outlet of the primary-side cooling part 944A may be connected to the inlet of the PCW supply unit 111 through the pipe L17, the three-way valve 921A, the pipe L5, and the pipe L4. This configuration may allow the primary cooling water to circulate between the primary-side cooling part 944A and the PCW supply unit 111.

The inlet of the secondary-side cooling part 945A may be connected to the tank 927A through the pipe L21, the pump 941A, and the pipe L20. The outlet of the secondary-side cooling part 945A may be connected to an inlet of the first aluminum-containing portion 102 through a pipe L22 serving as a circulation pipe. This configuration may allow the secondary cooling water flowing from the tank 927A to flow into the secondary-side cooling part 945A. Accordingly, the temperature of the secondary cooling water may be adjusted by the primary cooling water flowing in the primary-side cooling part 944A. Then, the temperature-adjusted secondary cooling water may be supplied to the first aluminum-containing portion 102.

The temperature sensor 946A may be provided on the pipe L22. The temperature sensor 946A may be connected to the controller 948A. The temperature sensor 946A may be configured to detect the temperature of the secondary cooling water flowing in the pipe L22 and send a signal corresponding to a detected temperature to the controller 948A. The controller 948A may control the three-way valve controller 925A, the heater power supply 938A, the valve 939A, and the pump 941A in accordance with signals from the flowmeter 926A, the upper limit switch 932A, the lower limit switch 933A, the temperature sensor 946A, and the timer 947A.

The third cooling water temperature control device 960A may be similar in configuration to the second cooling water temperature control device 920A. The third cooling water temperature control device 960A may include a three-way valve 961A, a three-way valve controller 965A, a flowmeter 966A, the tank 967A, a circulation adjuster 969A, a heater power supply 978A, a valve 979A, a butterfly valve 980A, a pump 981A, a filter 982A, the heat exchanger 983A, a temperature sensor 986A, a timer 987A, and the controller 988A.

A first inlet 962A of the three-way valve 961A may be connected to an outlet of a primary-side cooling part 984A of the heat exchanger 983A through a pipe L23 serving as a return pipe. An outlet 963A may be connected to the inlet of the PCW supply unit 111 through the pipe L6 and the pipe L4. A second inlet 964A may be connected to the pipe L3 through a pipe L24 serving as a feed-side bypass pipe. The three-way valve controller 965A may control the three-way valve 961A in accordance with a signal from the controller 988A to adjust an amount of primary cooling water supplied to a primary-side cooling part 984A. The flowmeter 966A may be provided on the pipe L3 upstream from a location where the pipe L24 branches off from the pipe L3. The flowmeter 966A may be configured to detect a flow rate of the primary cooling water flowing therethrough, and send a signal corresponding to a detected flow rate to the controller 988A.

The tank 967A may be connected to the outlet of the first copper-containing portion 103 through a pipe L25 serving as a circulation pipe so that the secondary cooling water that has been used to control the temperature of the first copper-containing portion 103 flows into the tank 967A. The tank 967A may be connected to the ordinary water supply unit 112 through the pipe L8 and the pipe L7 so that the secondary cooling water supplied from the ordinary water supply unit 112 flows into the tank 967A. The pipe L12 may be connected to the tank 967A at a side surface thereof to connect the tank 967A to the drain 113 through the pipe L12. A pipe L26 serving as a circulation pipe may be connected to the tank 967A at the bottom thereof to connect the tank 967A to an inlet of the pump 981A through the pipe L26.

With reference to FIGS. 3 and 4, the circulation adjuster 969A may include a cylinder 970A, a float 971A, an upper limit switch 972A serving as a fluid level detection unit, a lower limit switch 973A serving as a fluid level detection unit, and a heater 974A. The upper limit switch 972A and the lower limit switch 973A may detect the float 971A moving vertically in the cylinder 970A coming into contact thereto and send a signal indicative of the detection to the controller 988A.

The valve 979A may be provided on the pipe L8. The butterfly valve 980A may be provided on the pipe L25. The outlet of the pump 981A may be connected to an inlet of a secondary-side cooling part 985A of the heat exchanger 983A through a pipe L27 serving as a circulation pipe. The filter 982A may be provided on the pipe L26.

The heat exchanger 983A may be configured to adjust the temperature of the secondary cooling water using the primary cooling water, and the temperature-adjusted secondary cooling water may be used to control the temperature of the first copper-containing portion 103. The inlet of the primary-side cooling part 984A may be connected to the outlet of the PCW supply unit 111 through the pipe L3 and the pipe L1. The outlet of the primary-side cooling part 984A may be connected to the inlet of the PCW supply unit 111 through the pipe L23, the three-way valve 961A, the pipe L6, and the pipe L4. The inlet of the secondary-side cooling part 985A may be connected to the tank 967A through the pipe L27, the pump 981A, and the pipe L26. The outlet of the secondary-side cooling part 985A may be connected to the inlet of the first copper-containing portion 103 through a pipe L28 serving as a circulation pipe.

The temperature sensor 986A may be provided on the pipe L28. The temperature sensor 986A may be configured to detect the temperature of the secondary cooling water flowing in the pipe L28 and send a signal corresponding to a detected temperature to the controller 988A. The controller 988A may control the three-way valve controller 965A, the heater power supply 978A, the valve 979A, and the pump 981A in accordance with signals from the flowmeter 966A, the upper limit switch 972A, the lower limit switch 973A, the temperature sensor 986A, and the timer 987A.

With reference to FIG. 5, the second temperature control system 90B may be connected to the PCW supply unit 111, the drain 113, an inert gas supply unit 114, and a super pure water supply unit 115 serving as a secondary cooling water supply unit. The second temperature control system 90B may include the fourth cooling water temperature control device 920B and the fifth cooling water temperature control device 960B. The fourth and fifth cooling water temperature control devices 920B and 960B may control the temperature of the second aluminum-containing portion 105 and the second copper-containing portion 106, respectively, provided in the clean room floor CLF using the secondary cooling water, which is super pure water. Accordingly, even if leakages occur at pipes L49, L52, L55, and L58 to be described later, since leaking water is super pure water, contamination of the clean room floor CLF may be suppressed. The fourth and fifth cooling water temperature control devices 920B and 960B may be similar in configuration to the second and third cooling water temperature control devices 920A and 960A, respectively.

The outlet of the PCW supply unit 111 may be connected to an inlet of a primary-side cooling part 944B of a heat exchanger 943B of the fourth cooling water temperature control device 920B and to an inlet of a primary-side cooling part 984B of a heat exchanger 983B of the fifth cooling water temperature control device 960B through a pipe L32 serving as a feed pipe and a pipe L33 serving as a feed pipe that branches off from the pipe L32, respectively. The inlet of the PCW supply unit 111 may be connected to an outlet of the primary-side cooling part 944B and to an outlet of the primary-side cooling part 984B through a pipe L35 serving as a return pipe and a pipe L36 serving as a return pipe that branches off from the pipe L35, respectively.

The drain 113 may be connected to a tank 927B of the fourth cooling water temperature control device 920B and to a tank 967B of the fifth cooling water temperature control device 960B through a pipe L41 and a pipe L42 that branches off from the pipe L41 to discharge super pure water that is not used in the fourth and fifth cooling water temperature control devices 920B and 960B.

The inert gas supply unit 114 may be connected to the tanks 927B and 967B through a pipe L43 and a pipe L44 that branches off from the pipe L43, respectively. The inert gas supply unit 114 may supply inert gas such as nitrogen gas to the fourth and fifth cooling water temperature control devices 920B and 960B.

The super pure water supply unit 115 may be connected to the tanks 927B and 967B through a pipe L37 and a pipe L38 serving as an injection pipe that branches off from the pipe L37, respectively. The super pure water supply unit 115 may be configured to supply super pure water to each of the tanks 927B and 967B as the secondary cooling water.

In each of the fourth and fifth cooling water temperature control device 920B and 960B, PCW may be used as the primary cooling water and super pure water may be used as the secondary cooling water. In each of the fourth and fifth cooling water temperature control devices 920B and 960B, the temperature of the secondary cooling water may be adjusted using the primary cooling water, and the temperature-adjusted secondary cooling water may be used to control the temperature of each of the second aluminum-containing portion 105 and the second copper-containing portion 106. For example, the temperature of the secondary cooling water may be adjusted to 25° C. using the primary cooling water in a temperature range from 10° C. to 21° C. inclusive, and the temperature of each of the second aluminum-containing portion 105 and the temperature of the second copper-containing portion 106 may be controlled using the temperature-adjusted secondary cooling water at 25° C.

The fourth cooling water temperature control device 920B may include a three-way valve 921B, a three-way valve controller 925B, a flowmeter 926B, the tank 927B, a circulation adjuster 929B, a heater power supply 938B, a valve 939B, a butterfly valve 940B, a pump 941B, a filter 942B, the heat exchanger 943B, a temperature sensor 946B, a timer 947B, and the controller 948B. The fifth cooling water temperature control device 960B may include a three-way valve 961B, a three-way valve controller 965B, a flowmeter 966B, the tank 967B, a circulation adjuster 969B, a heater power supply 978B, a valve 979B, a butterfly valve 980B, a pump 981B, a filter 982B, the heat exchanger 983B, a temperature sensor 986B, a timer 987B, and the controller 988B.

First inlets 922B and 962B of the respective three-way valves 921B and 961B may be connected to the outlet of the primary-side cooling part 944B of the heat exchanger 943B and the outlet of the primary-side cooling part 984B of the heat exchanger 983B through pipes L47 and L53 serving as first return pipes, respectively. Outlets 923B and 963B of the respective three-way valves 921B and 961B may be connected to the inlet of the PCW supply unit 111 through the pipes L35 and L36, respectively. A second inlet 924B may be connected to the pipe L32 through a pipe L48 serving as a feed-side bypass pipe. A second inlet 964B may be connected to the pipe L33 through a pipe L54 serving as a feed-side bypass pipe. The three-way valve controllers 925B and 965B may control the three-way valves 921B and 961B, respectively, in accordance with signals from the controllers 948B and 988B. As the three-way valves 921B and 961B are controlled, the amount of primary cooling water supplied to the primary-side cooling parts 944B and 984B may be adjusted.

The flowmeter 926B may be provided on the pipe L32 upstream from a location where the pipe L48 branches off from the pipe L32. The flowmeter 966B may be provided on the pipe L33 upstream from a location where the pipe L54 branches off from the pipe L33. The flowmeters 926B and 966B may be configured to detect flow rates of the primary cooling water flowing in the pipes L32 and L33, respectively, and send signals corresponding to detected flow rates to the controllers 948B and 988B, respectively.

With reference to FIGS. 5 and 6, the tanks 927B and 967B may be connected to the outlets of the second aluminum-containing portion 105 and the second copper-containing portion 106 through pipes L49 and L55 serving as circulation pipes, respectively. This configuration may allow the secondary cooling water that has been used to control the temperature of each of the second aluminum-containing portion 105 and the second copper-containing portion 106 to flow into the tanks 927B and 967B. The tanks 927B and 967B may be connected to the super pure water supply unit 115 through the pipes L37 and L38, respectively. This configuration may allow the secondary cooling water supplied from the super pure water supply unit 115 to flow into the tanks 927B and 967B.

The tanks 927B and 967B may be connected at side surfaces thereof to the drain 113 through the pipes L41 and L42, respectively. Plates 928B and 968B may be provided on the bottoms of the respective tanks 927B and 967B to extend vertically halfway inside the tanks 927B and 967B, respectively. The tanks 927B and 967B may be connected at the bottoms thereof to the inlets of the pumps 941B and 981B, respectively, through pipes L50 and L56 serving as circulation pipes.

The circulation adjuster 929B may include a cylinder 930B, a float 931B, an upper limit switch 932B serving as a fluid level detection unit, a lower limit switch 933B serving as a fluid level detection unit, a heater 934B, and a bubble generator 935B serving as an inert gas introduction unit. The circulation adjuster 969B may include a cylinder 970B, a float 971B, an upper limit switch 972B serving as a fluid level detection unit, a lower limit switch 973B serving as a fluid level detection unit, a heater 974B, and a bubble generator 975B serving as an inert gas introduction unit.

Each of the cylinders 930B and 970B may have a slit or an opening (not separately shown) formed therein so that the secondary cooling water in the tanks 927B and 967B may flow into the cylinders 930B and 970B.

The upper limit switches 932B and 972B may be provided in the cylinders 930B and 970B, respectively, toward the upper ends thereof. The lower limit switches 933B and 973B may be provided in the cylinders 930B and 970B, respectively, toward the lower ends thereof. Each of the upper limit switch 932B and the lower limit switch 933B may be configured to detect the float 931B coming into contact thereto and send a signal indicative of the detection to the controller 948B. Each of the upper limit switch 972B and the lower limit switch 973B may be configured to detect the float 971B coming into contact thereto and send a signal indicative of the detection to the controller 988B.

The heaters 934B and 974B may be provided in the tanks 927B and 967B to be positioned between the plates 928B and 968B and the cylinders 930B and 970B, respectively. Each of the heaters 934B and 974B may be provided such that at least a part thereof is located below the lower limit switches 933B and 973B, respectively. The heaters 934B and 974B may be connected to the heater power supplies 938B and 978B, respectively.

The bubble generators 935B and 975B may be provided in the respective tanks 927B and 967B with the respective plates 928B and 968B provided between the bubble generators 935B and 975B and the heaters 934B and 974B. Each of the bubble generators 935B and 975B may be formed of a porous material. The bubble generators 935B and 975B may be connected to the inert gas supply unit 114 through the pipes L43 and L44, respectively, that penetrate the upper surface of the respective tanks 927B and 967B. Accordingly, when inert gas is supplied to the bubble generators 935B and 975B from the inert gas supply unit 114, bubbles 937B and 977B may be generated through openings 936B and 976B. As the bubbles 937B and 977B pass through the secondary cooling water, the oxygen concentration in the secondary cooling water may be reduced. By reducing the oxygen concentration in the secondary cooling water, metal portions such as pipes constituting the fourth and fifth cooling water temperature control devices 920B and 960B may be prevented from being oxidized and rusted.

As described above, each of the pipes L50 and L56 may be provided to the side of each of the plates 928B and 968B opposite to the bubble generators 935B and 975B. Thus, the bubbles 937B and 977B may be prevented from moving toward the pipes L50 and L56 by the plates 928B and 968B. Accordingly, the bubbles 937B and 977B may be prevented from mixing into the secondary cooling water flowing out through the pipes L50 and L56.

The heater power supplies 938B and 978B may supply power to the heaters 934B and 974B, respectively, in accordance with signals from the controllers 948B and 988B. The valve 939B may be provided on the pipe L37 downstream from a location where the pipe L38 branches off from the pipe L37. The valve 979B may be provided on the pipe L38. The valves 939B and 979B may be switched under the control of the respective controllers 948B and 988B. The butterfly valves 940B and 980B may be provided on the pipes L49 and L55, respectively.

Outlets of the pumps 941B and 981B may be connected to inlets of secondary-side cooling parts 945B and 985B of the heat exchangers 943B and 983B through pipes L51 and L57, respectively, serving as circulation pipes. The pumps 941B and 981B may control the flow rate of the secondary cooling water flowing in the pipes L51 and L57 in accordance with signals from the controllers 948B and 988B, respectively. The filters 942B and 982B may be provided on the pipes L50 and L56, respectively.

The heat exchangers 943B and 938B may be configured to adjust the temperature of the secondary cooling water using the primary cooling water, and the temperature-adjusted secondary cooling water may be used to control the temperature of each of the second aluminum-containing portion 105 and the second copper-containing portion 106. The inlets of the primary-side cooling parts 944B and 984B may be connected to the outlet of the PCW supply unit 111 through the pipes L32 and L33, respectively. The outlet of the primary-side cooling part 944B may be connected to the inlet of the PCW supply unit 111 through the pipe L47, the three-way valve 921B, and the pipe L35. The outlet of the primary-side cooling part 984B may be connected to the inlet of the PCW supply unit 111 through the pipe L53, the three-way valve 961B, the pipe L36, and the pipe L35. This configuration may allow the primary cooling water to circulate between the primary-side cooling part 944B and the PCW supply unit 111 and between the primary-side cooling part 984B and the PCW supply unit 111.

The inlet of the secondary-side cooling part 945B may be connected to the tank 927B through the pipe L51, the pump 941B, and the pipe L50. The outlet of the secondary-side cooling part 945B may be connected to an inlet of the second aluminum-containing portion 105 through a pipe L52 serving as a circulation pipe. The inlet of the secondary-side cooling part 985B may be connected to the tank 967B through the pipe L57, the pump 981B, and the pipe L56. The outlet of the secondary-side cooling part 985B may be connected to an inlet of the second copper-containing portion 106 through a pipe L58 serving as a circulation pipe. This configuration may allow the secondary cooling water flowing out from the tanks 927B and 967B to flow into the secondary-side cooling parts 945B and 985B. Accordingly, the temperature of the secondary cooling water may be adjusted by the primary cooling water flowing in the primary-side cooling parts 944B and 984B. The temperature-adjusted secondary cooling water may then be supplied to the second aluminum-containing portion 105 and the second copper-containing portion 106.

The temperature sensors 946B and 986B may be provided on the pipes L52 and L58, respectively. The temperature sensors 946B and 986B may be configured to detect the temperature of the secondary cooling water flowing in the pipes L52 and L58, and send signals corresponding to a detected temperature to the controllers 948B and 988B. The controllers 948B and 988B may control the three-way valve controllers 925B and 965B, the heater power supplies 938B and 978B, the valves 939B and 979B, and the pumps 941B and 981B in accordance with signals from the flowmeters 926B and 966B, the upper limit switches 932B and 972B, the lower limit switches 933B and 973B, the temperature sensors 946B and 986B, and the timers 947B and 987B, respectively.

Figure 7:
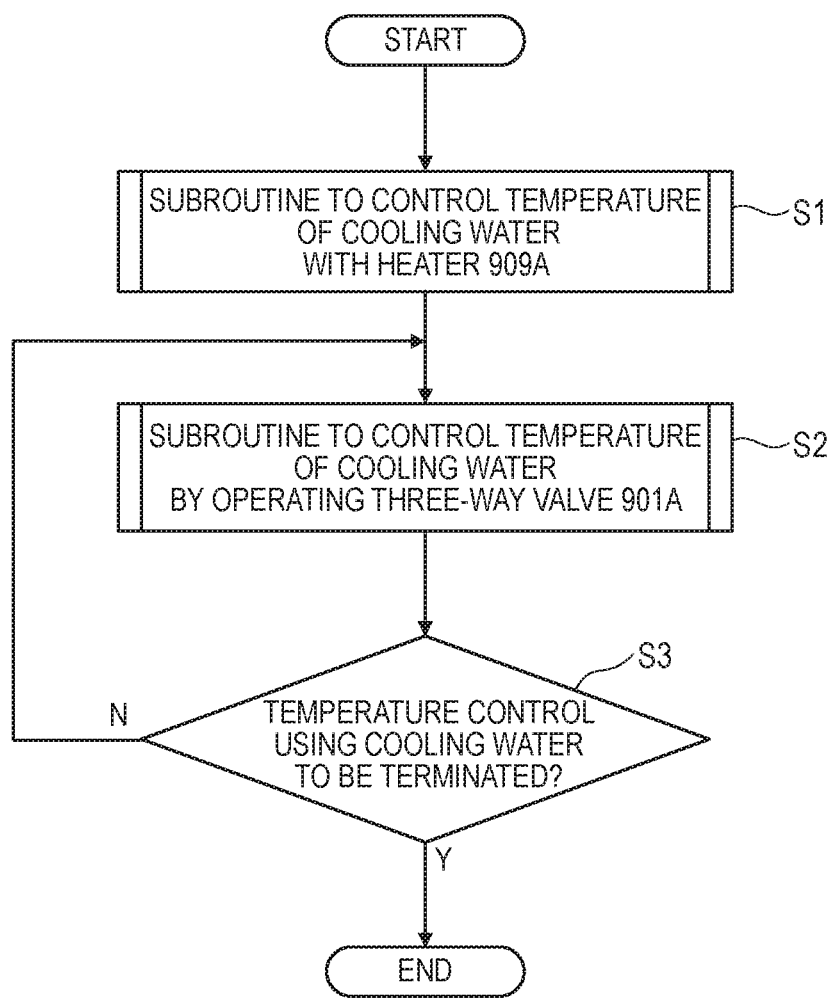
FIG. 7 is a flowchart showing a temperature control process in a first cooling water temperature control device.
Figure 8:
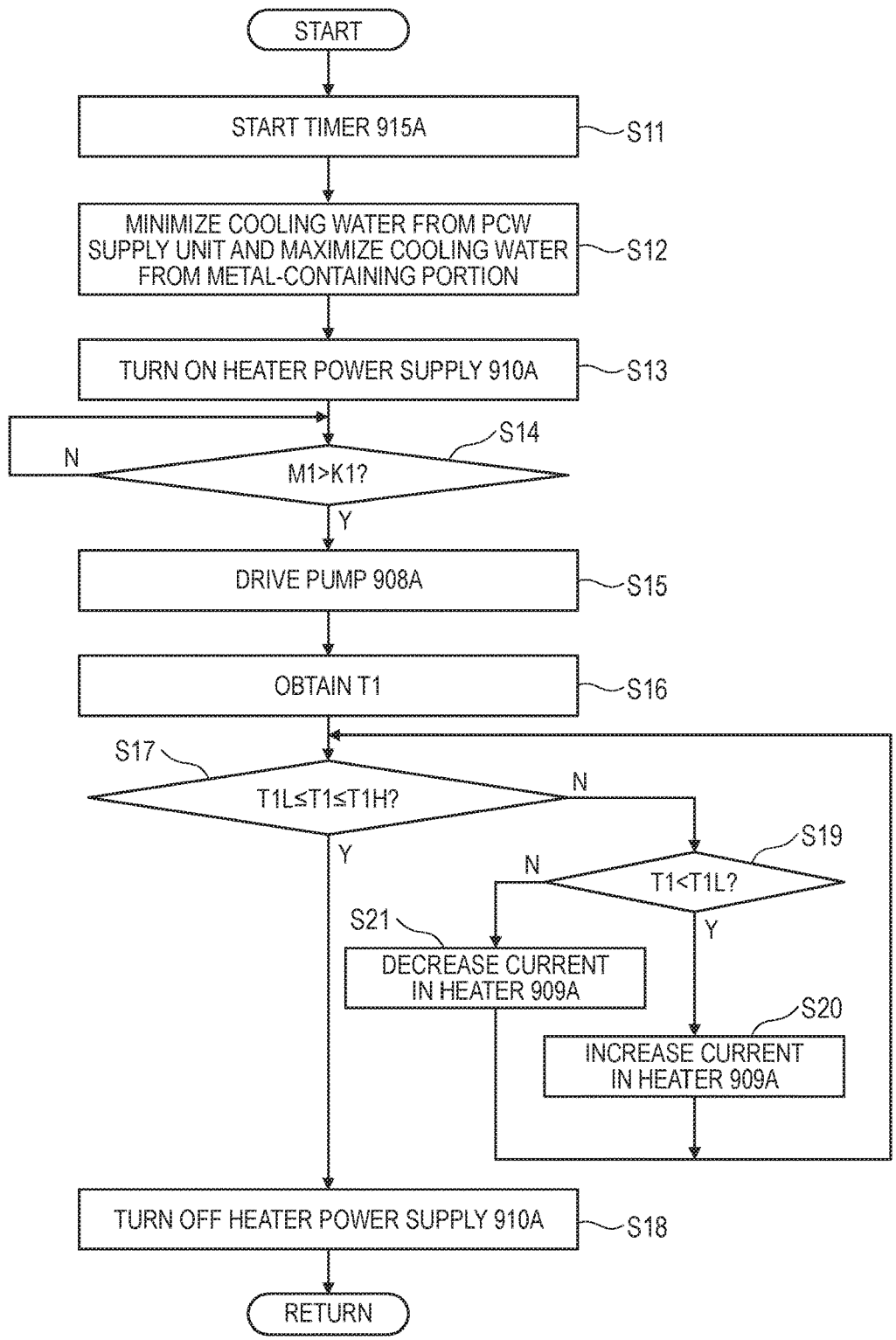
FIG. 8 is a flowchart showing a subroutine for controlling a temperature of cooling water with a heater.
Figure 9:
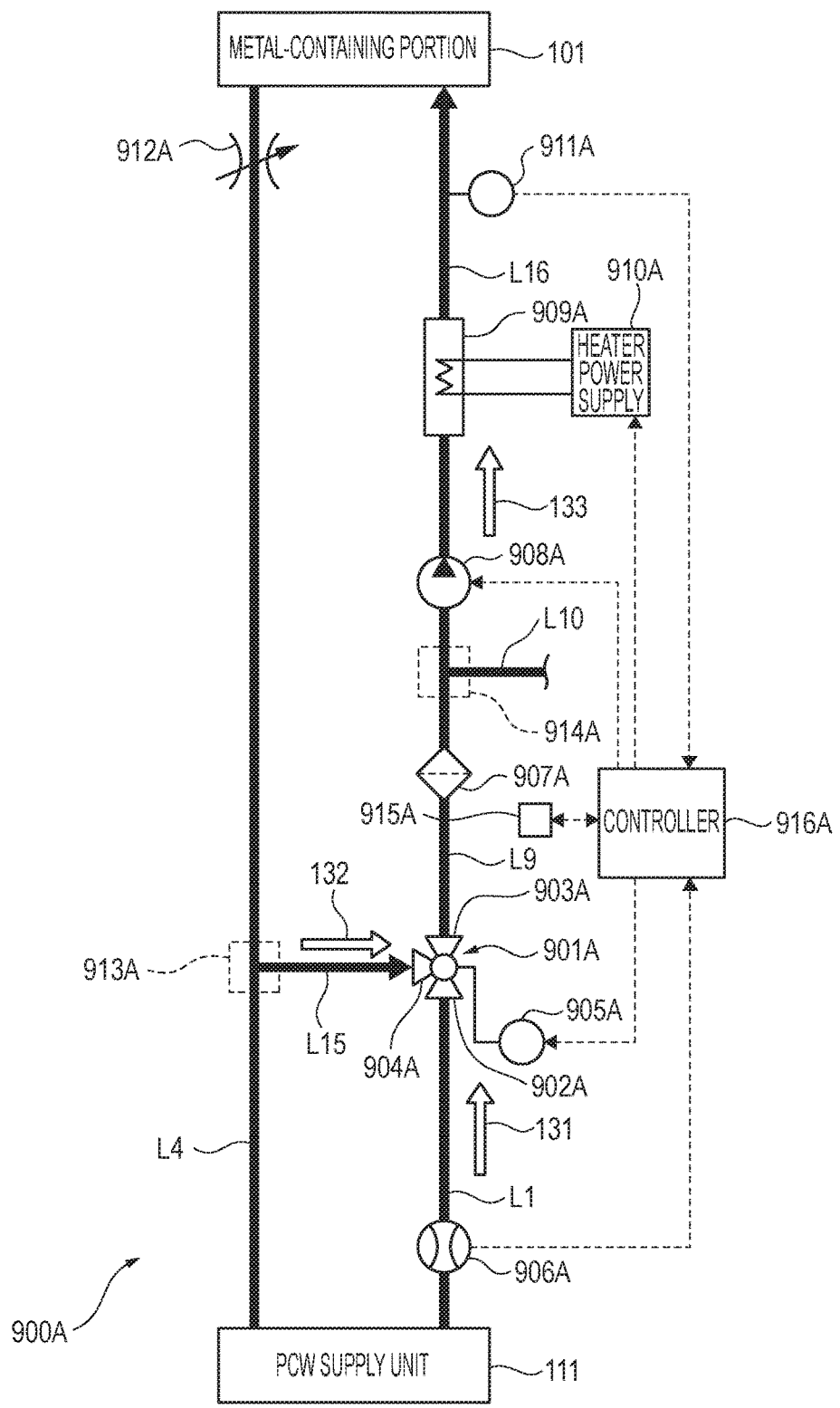
FIG. 9 schematically illustrates the first cooling water temperature control device in operation during the temperature control process.
Figure 10:
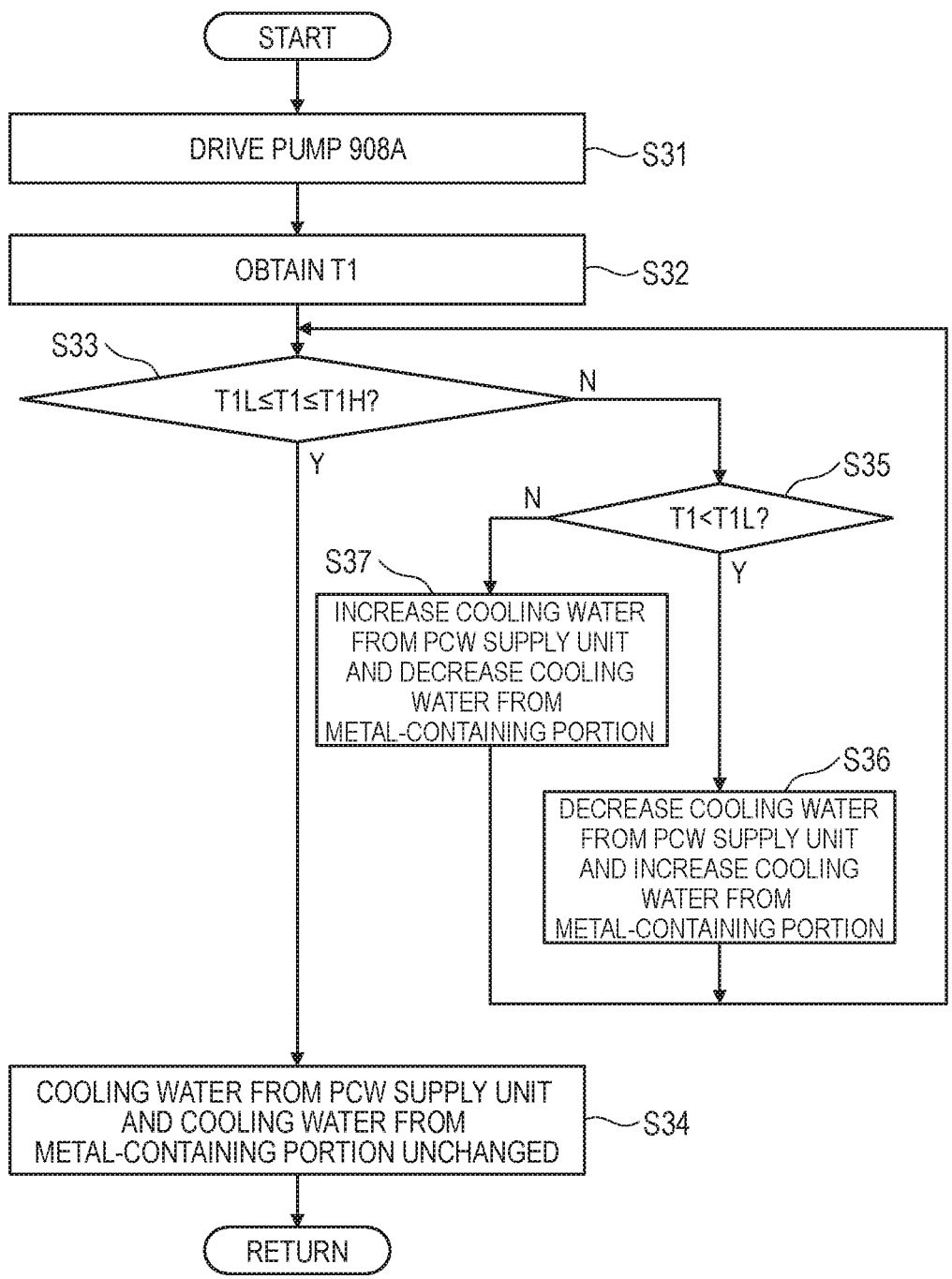
FIG. 10 is a flowchart showing a subroutine for controlling a temperature of cooling water by operating a three-way valve.

3.2.2 Operation 3.2.2.1 Temperature Control Process in First Cooling Water Temperature Control Device FIG. 7 is a flowchart showing a temperature control process in the first cooling water temperature control device. FIG. 8 is a flowchart showing a subroutine for controlling a temperature of cooling water with a heater. FIG. 9 schematically illustrates the first cooling water temperature control device in operation during the temperature control process. FIG. 10 is a flowchart showing a subroutine for control a temperature of cooling water by operating a three-way valve.

With reference to FIG. 7, the controller 916A of the first cooling water temperature control device 900A may carry out a subroutine for controlling the temperature of the cooling water with the heater 909A in a state where PCW is present as the cooling water at least in the pipe L9, the pipe L16, the metal-containing portion 101, the pipe L4, and the pipe L15 (Step S1). Through the process in Step S1, the temperature of the cooling water supplied to the metal-containing portion 101 from the PCW supply unit 111 may fall in a range from a lower limit temperature T1L to an upper limit temperature T1H inclusive. A temperature range is defined by the upper limit temperature T1H and the lower limit temperature T1L. A target temperature of the cooling water serving as a median value is, for example, 25° C. For example, the upper limit temperature T1H may be 25.1° C., and the lower limit temperature T1L may be 24.9° C.

More specifically, with reference to FIG. 8, the controller 916A may set the timer 915A to start measuring a time M1 (Step S11). The controller 916A may then control the three-way valve 901A to minimize the amount of cooling water 131 (see FIG. 9) supplied from the PCW supply unit 111 and flowing into the pump 908A through the pipes L1 and L9 and maximize the amount of cooling water 132 (see FIG. 9) flowing from the metal-containing portion 101 into the pump 908A through the pipes L4 and L15 (Step S12). Here, the controller 916A may send a signal to the three-way valve controller 905A to close a flow channel from the first inlet 902A to the outlet 903A and fully open a flow channel from the second inlet 904A to the outlet 903A.

Then, the controller 916A may turn on the heater power supply 910A to start heating cooling water 133 (see FIG. 9) with the heater 909A (Step S13). Thus, the temperature of the cooling water 133 in the pipe L16 may rise. Thereafter, the first controller 918A may determine whether or not the time M1 has exceeded a time K1 set in advance (Step S14). The time K1 may be set to a time it takes for the temperature of the cooling water 133 to rise to a temperature that falls within a range from the lower limit temperature T1L to the upper limit temperature T1H inclusive. When the controller 916A determines that the time M1 has not exceeded the time K1 (Step S14; NO), the controller 916A may repeat Step S14. When the controller 916A determines that the time M1 has exceeded the time K1 (Step S14; YES), the controller 916A may send a signal to the pump 908A to drive the pump 908A (Step S15). As the pump 908A is driven, PCW that has been present as the cooling water 132 and 133 since the start of the process may circulate in the pipes L4, L15, L9, and L16 and the metal-containing portion 101 without the cooling water being newly supplied from the PCW supply unit 111. Then, as the PCW passes through the pipe L16 as the cooling water 133, the temperature of the cooling water 133 may rise.

Thereafter, the controller 916A may measure a temperature of the cooling water 133 with the temperature sensor 911A to obtain a temperature T1 of the cooling water 133 (Step S16). Then, the controller 916A may determine whether or not the temperature T1 falls within a range from the lower limit temperature T1L to the upper limit temperature T1H inclusive (Step S17). Here, the temperature of the cooling water 133 may rise by being heated with the heater 909A or through heat exchange between the metal-containing portion 101 and the cooling water 133 while circulating through the pipes L4, L15, L9, and L16.

When the controller 916A determines that the temperature T1 falls within a range from the lower limit temperature T1L to the upper limit temperature T1H inclusive (Step S17; YES), the controller 916A may turn off the heater 909A (Step S18) to terminate the subroutine to control the temperature of the cooling water 133 with the heater 909A. When the controller 916A determines that the temperature T1 does not fall within a range from the lower limit temperature T1L to the upper limit temperature T1H inclusive (Step S17; NO), the controller 916A may determine whether or not the temperature T1 falls below the lower limit temperature T1L (Step S19). When the controller 916A determines that the temperature T1 falls below the lower limit temperature T1L (Step S19; YES), the controller 916A may increase a current in the heater 909A (Step S20) and return to Step S17. Thus, the temperature of the cooling water 133 may rise to a temperature equal to or higher than the lower limit temperature T1L. When the controller 916A determines that the temperature T1 does not fall below the lower limit temperature T1L (Step S19; NO), the controller 916A may decrease a current in the heater 909A (Step S21) because it can be considered that the temperature T1 exceeds the upper limit temperature T1H. Thus, the temperature of the cooling water 133 may fall to a temperature equal to or lower than the upper limit temperature T1H. Then, the controller 916A may return to Step S17. Through the above-described process, the cooling water 133 whose temperature has been adjusted to a temperature within a range from the lower limit temperature T1L to the upper limit temperature T1H inclusive may be supplied to the metal-containing portion 101.

The controller 916A may then carry out a subroutine to control the temperature of the cooling water 133 by operating the three-way valve 901A (Step S2). With the process in Step S2, the temperature of the cooling water 133 may be controlled without using the heater 909A. Prior to Step S2, the apparatus has not been warmed up, thus, the cooling water needs to be heated with the heater. However, in Step S2, the apparatus is already warmed up and heat emitted from the apparatus can be used to control the temperature of the cooling water by properly regulating the three-way valve.

More specifically, with reference to FIG. 10, the controller 916A may drive the pump 908A (Step S31) and then measure the temperature of the cooling water 133 to obtain the temperature T1 (Step S32). The controller 916A may determine whether or not the temperature T1 falls within a range from the lower limit temperature T1L to the upper limit temperature T1H inclusive (Step S33).

When the controller 916A determines that the temperature T1 falls within a range from the lower limit temperature T1L to the upper limit temperature T1H inclusive (Step S33; YES), the controller 916A may terminate the subroutine without changing the amount of cooling water 131 supplied from the PCW supply unit 111 and the amount of cooling water 133 flowing from the metal-containing portion 101 (Step S34). Since the ratio of the cooling water 131 to the cooling water 132 in the cooling water 133 does not change through the process in Step S34, the temperature of the cooling water 133 may be retained within a range from the lower limit temperature T1L to the upper limit temperature T1H inclusive.

When the controller 916A determines that the temperature T1 does not fall within a range from the lower limit temperature T1L to the upper limit temperature T1H inclusive (Step S33; NO), the controller 916A may then determine whether or not the temperature T1 falls below the lower limit temperature T1L (Step S35). When the controller 916A determines that the temperature T1 falls below the lower limit temperature T1L (Step S35; YES), the controller 916A may control the three-way valve 901A to adjust the ratio of the cooling water 131 supplied from the PCW supply unit 111 to the cooling water 132 flowing from the metal-containing portion 111 in the cooling water 133 (Step S36, i.e., decrease the cooling water 131 and increase the cooling water 132), and return to Step S33. Accordingly, the temperature of the cooling water 133 may rise.

When the controller 916A determines that the temperature T1 does not fall below the lower limit temperature T1L (Step S35; NO), the controller 916A may control the three-way valve 901A to adjust the ratio of the cooling water 131 supplied from the PCW supply unit 111 to the cooling water 132 flowing from the metal-containing portion 111 in the cooling water 133 (Step S37, i.e., increase the cooling water 131 and decrease the cooling water 132). This is so because it can be considered that the temperature T1 exceeds the upper limit temperature T1H. Then, the controller 916A may return to Step S33. Accordingly, the temperature of the cooling water 133 may fall.

Through the above-described process, the cooling water 133 whose temperature has been adjusted to a temperature within a range from the lower limit temperature T1L to the upper limit temperature T1H inclusive may be supplied to the metal-containing portion 101.

Referring back to FIG. 7, the controller 916A may then determine whether or not the control of the temperature of the metal-containing portion 101 using the cooling water 133 is to be terminated (Step S3). When the controller 916A determines that the control is not to be terminated (Step S3; NO), the controller 916A may return to Step S2. When the controller 916A determines that the control is to be terminated (Step S3; YES), the process in this flowchart may be terminated.

3.2.2.2 Temperature Control Process in Second Through Fifth Cooling Water Temperature Control Devices Hereinafter, the temperature control process in the second cooling water temperature control device 920A will be described. Since similar processes may be carried out in the third, fourth, and fifth cooling water temperature control devices 960A, 920B, and 960B, the description thereof will be omitted or simplified.

3.2.2.2.1 Injection Process of Secondary Cooling Water

Figure 11:
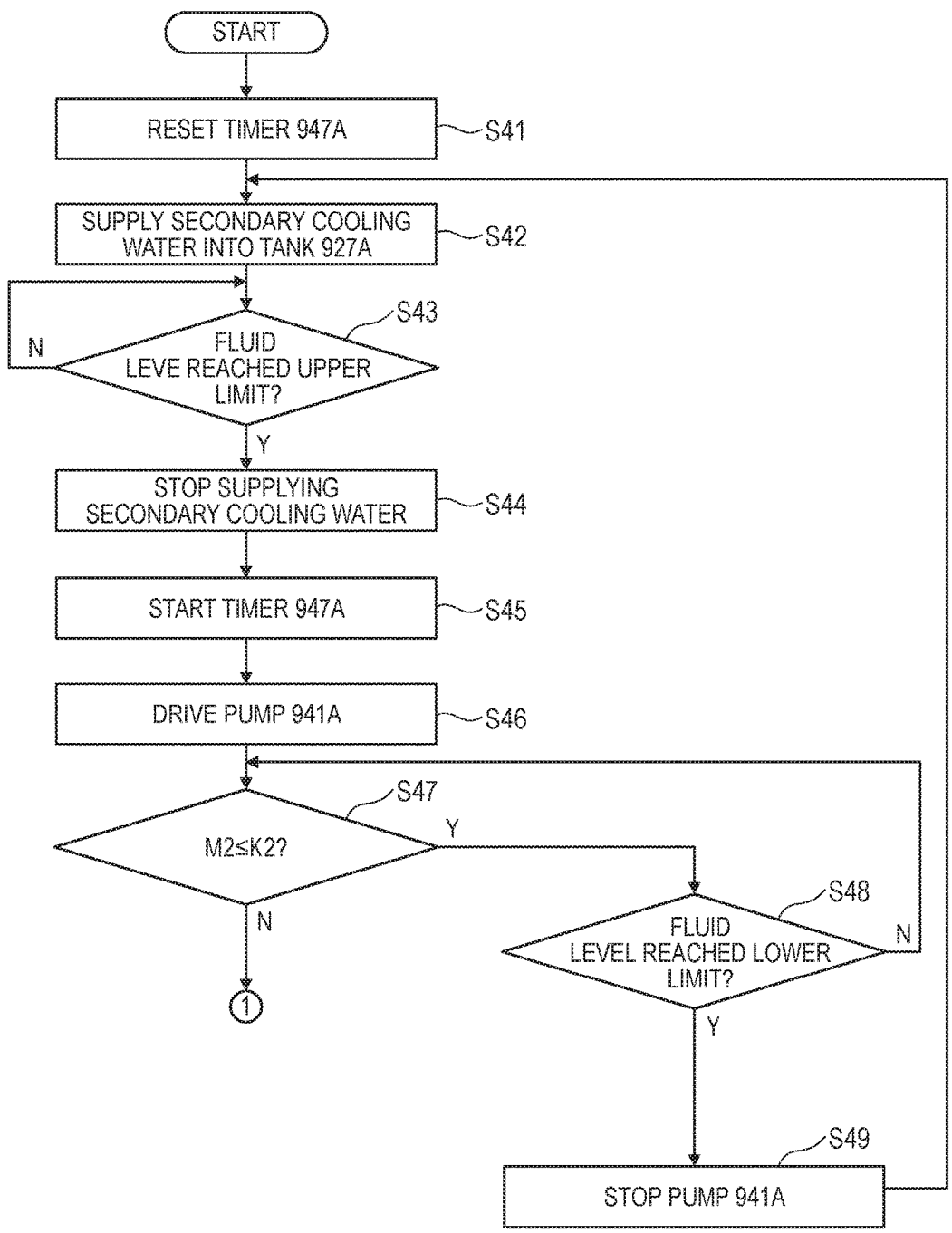
FIG. 11 is a flowchart showing an injection process of secondary cooling water.
Figure 12:
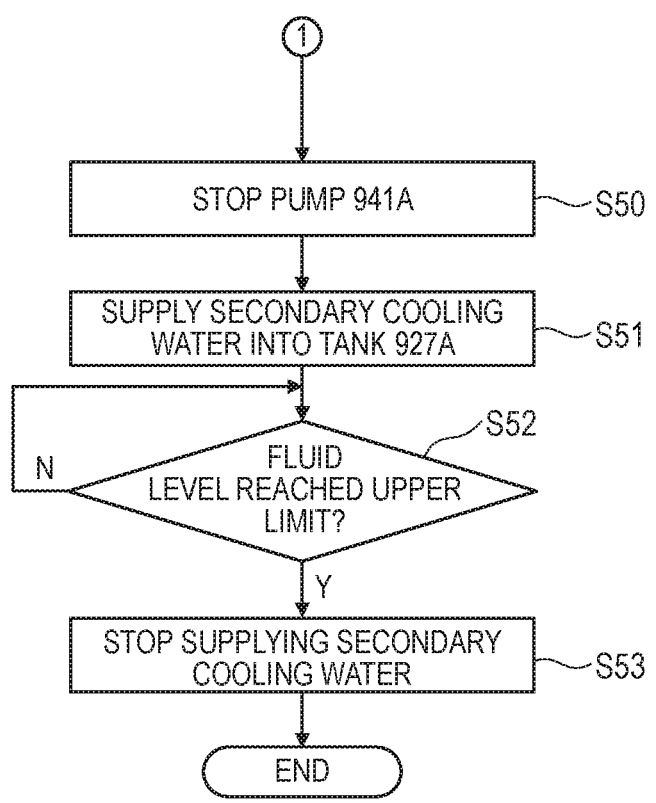
FIG. 12 is a flowchart showing an injection process of secondary cooling water.

FIGS. 11 and 12 show a flowchart showing an injection process of secondary cooling water. With reference to FIGS. 11 and 12, the controller 948A may first reset the timer 947A in a state where a secondary cooling water circulation channel that is constituted by the tank 927A, the pipe L20, the pipe L21, the secondary-side cooling part 945A, the pipe L22, the first aluminum-containing portion 102, and the pipe L19 is not filled with the secondary cooling water (Step S41). Then, the controller 948A may open the valve 939A to supply ordinary water from the ordinary water supply unit 112 into the tank 927A as the secondary cooling water (Step S42). Subsequently, the controller 948A may determine whether or not the float 931A has come into contact with the upper limit switch 932A based on a signal from the upper limit switch 932A (Step S43). That is, the controller 948A may determine whether or not the fluid level of the secondary cooling water has reached the upper limit. When the controller 948A determines that the fluid level has not reached the upper limit (Step S43; NO), the controller 948A may repeat Step S43. When the controller 948A determines that the fluid level has reached the upper limit, the controller 948A may close the valve 939A to stop supplying the secondary cooling water (Step S44). Here, when the process in Step S44 ends, the secondary cooling water may be present in the tank 927A, the pipe L20, the pipe L21, and the secondary-side cooling part 945A.

Thereafter, the controller 948A may start measuring a time M2 by the timer 947A (Step S45) and then drive the pump 941A (Step S46). When the pump 941A is driven, the secondary cooling water remaining in the tank 927A may flow into the first aluminum-containing portion 102 through the pipe L22, and the fluid level of the secondary cooling water in the tank 927A may fall. Then, the controller 948A may determine whether or not the secondary cooling water has returned to the tank 927A through the pipe L19. More specifically, the controller 948A may determine whether or not the time M2 has reached or exceeded a time K2 set in advance (Step S47). The time K2 may set to a time that is longer than a time it takes for an empty secondary cooling water circulation channel to be filled with the secondary cooling water.

When the controller 948A determines that the time M2 has not reached the time K2 (Step S47; Yes), the controller 948A may determine whether or not the second float 931A has come into contact with the lower limit switch 933A. That is, the controller 948A may determine whether or not the fluid level of the secondary cooling water in the tank 927A has reached the lower limit (Step S48). When the fluid level of the secondary cooling water reaches the lower limit before the time M2 reaches the time K2, the controller 948A may determine that the secondary cooling water circulation channel has not been filled with the secondary cooling water.

When the controller 948A determines that the fluid level has not reached the lower limit (Step S48; N), the controller 948A may return to Step S47. When the controller 948A determines that the fluid level has reached the lower limit (Step S48; YES), the controller 948A may stop the pump 941A (Step S49) to stop circulation of the secondary cooling water. Thus, the secondary cooling water can be newly added to the tank 927A from the ordinary water supply unit 112 and be stored therein. Thereafter, the controller 948A may return to Step S42 to newly supply the secondary cooling water into the secondary cooling water circulation channel.

When the controller 948A determines that the time M2 has exceeded the time K2 without the fluid level of the secondary cooling water in the tank 927A reaching the lower limit (Step S47; YES), the controller 948A may stop the pump 941A (Step S50). The above case indicates that; the secondary cooling water may have been supplied from the ordinary water supply unit 112 in an amount sufficient to fill the secondary cooling water circulation channel except for the tank 927A.

Subsequently, the controller 948A may supply the secondary cooling water to the tank 927A from the ordinary water supply unit 112 (Step S51). Then, the controller 948A may determine whether or not the fluid level of the secondary cooling water in the tank 927A has reached the upper limit (Step S52). When the controller 948A determines that the fluid level has not reached the upper limit (Step S52; NO), the controller 948A may repeat Step S52. When the controller 948A determines that the fluid level has reached the upper limit (Step S52; YES), the controller 948A may stop supplying the secondary cooling water (Step S53). Through the above-described process, the entire secondary cooling water circulation channel may be filled with the secondary cooling water.

Figure 13:
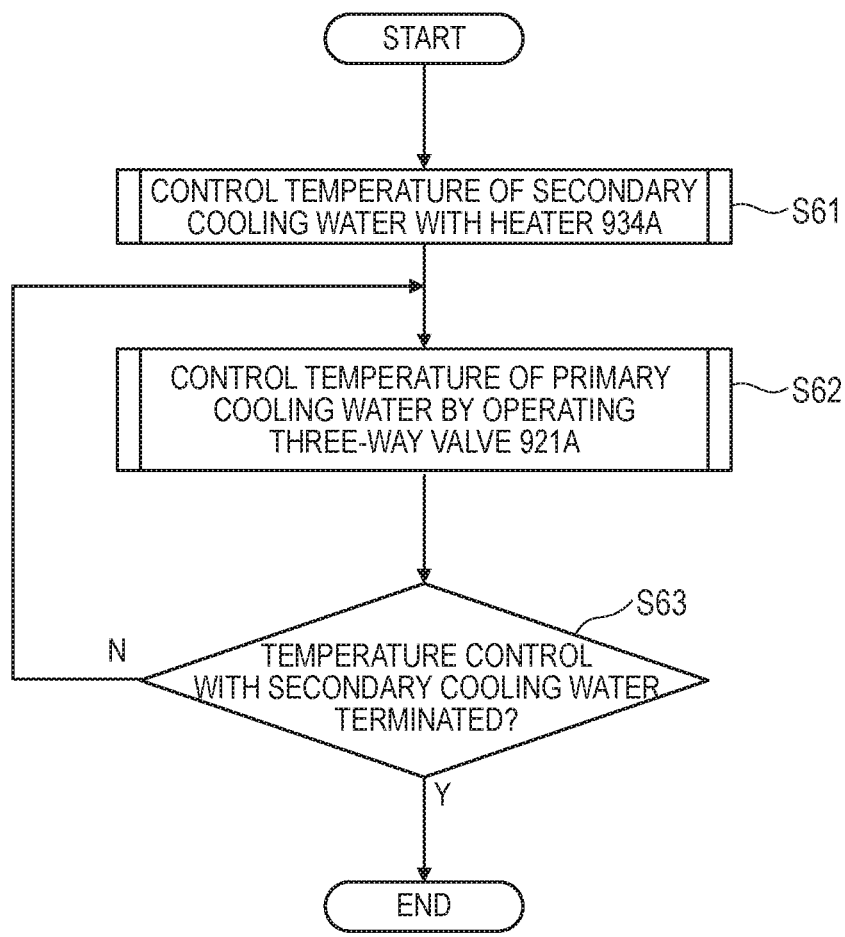
FIG. 13 is a flowchart showing a temperature control process in second through fifth cooling water temperature control devices.
Figure 14:
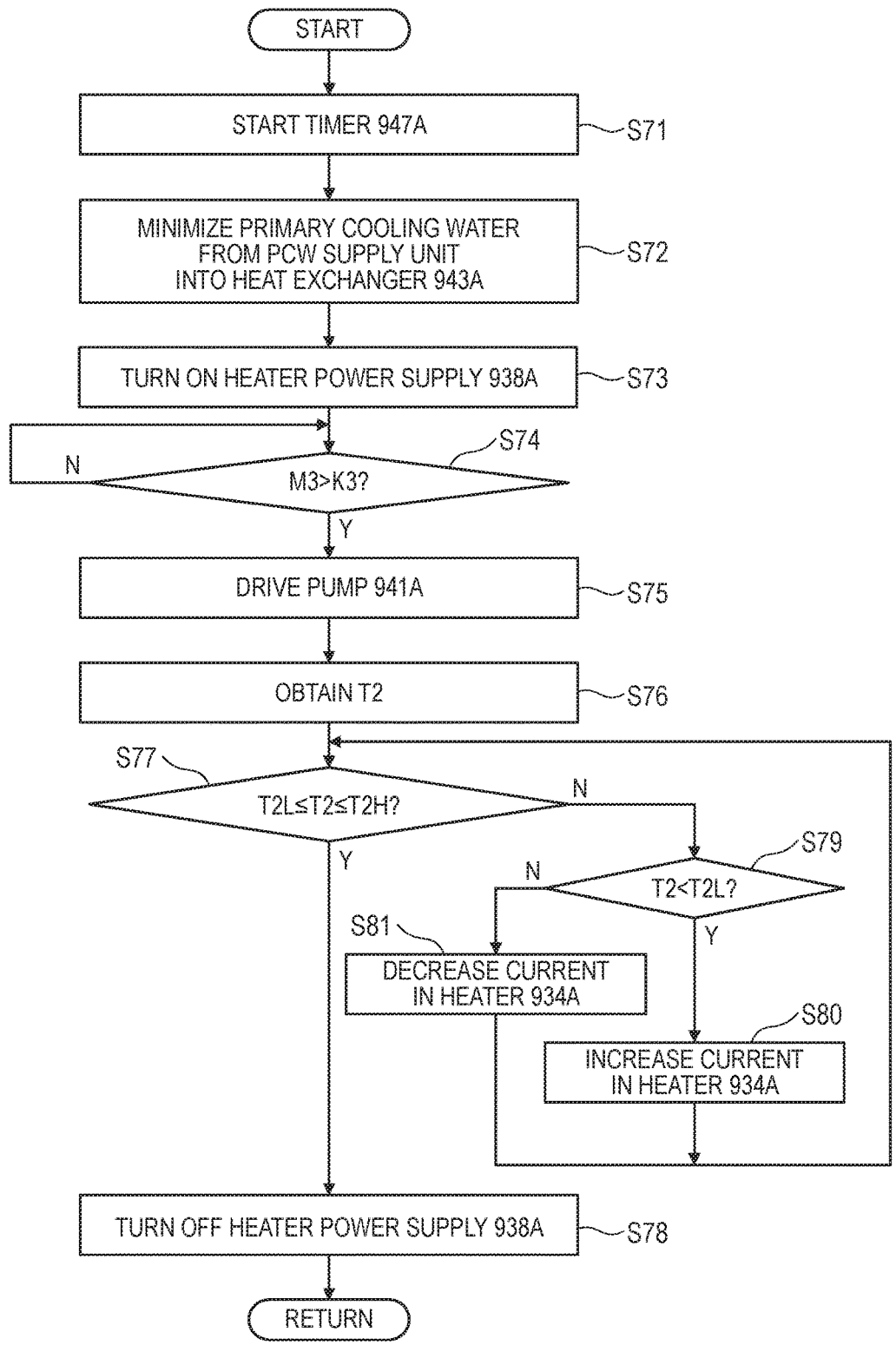
FIG. 14 is a flowchart showing a subroutine for controlling a temperature of secondary cooling water with a heater.
Figure 15:
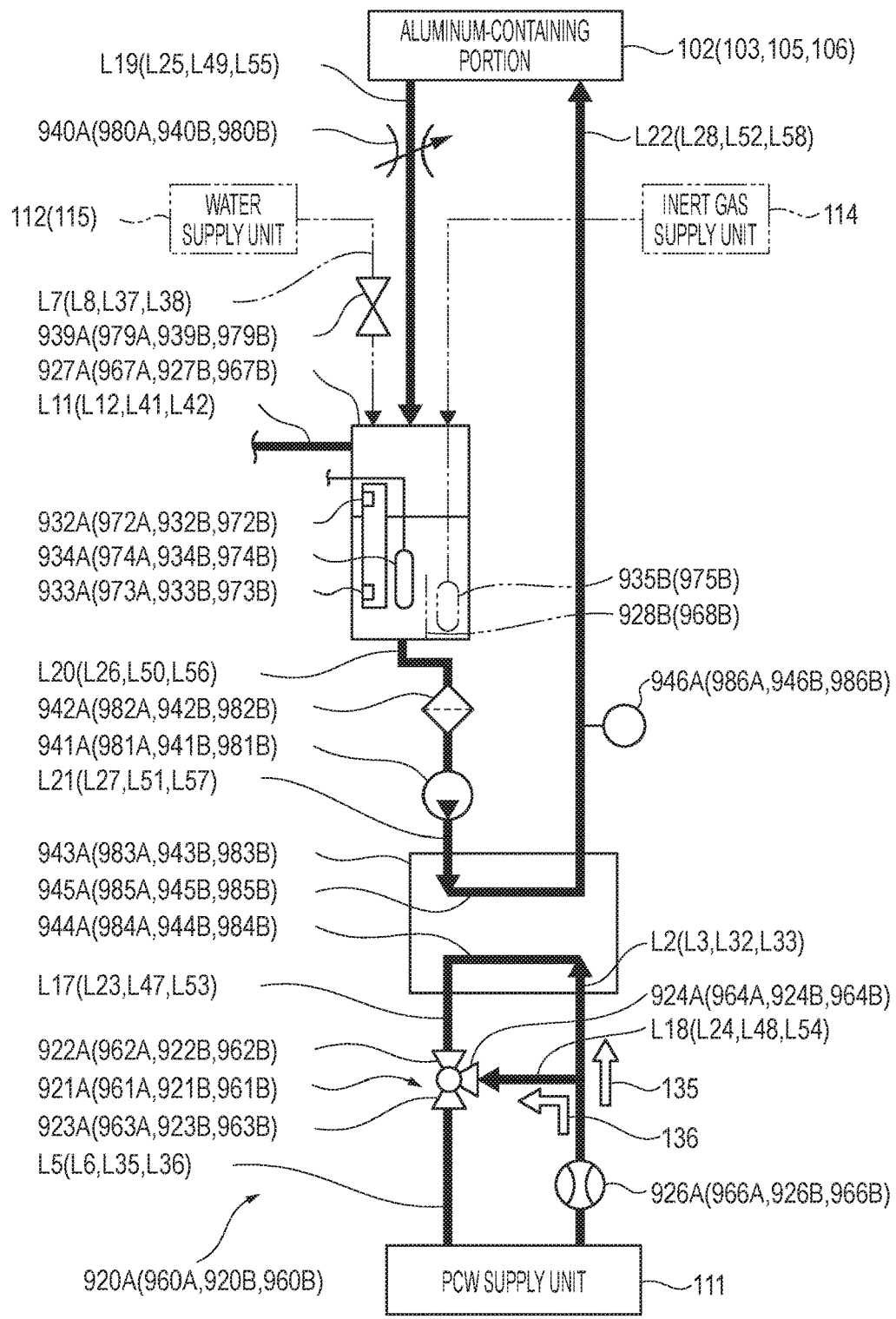
FIG. 15 schematically illustrates the second through fifth cooling water temperature control devices in operation during the temperature control process.
Figure 16:
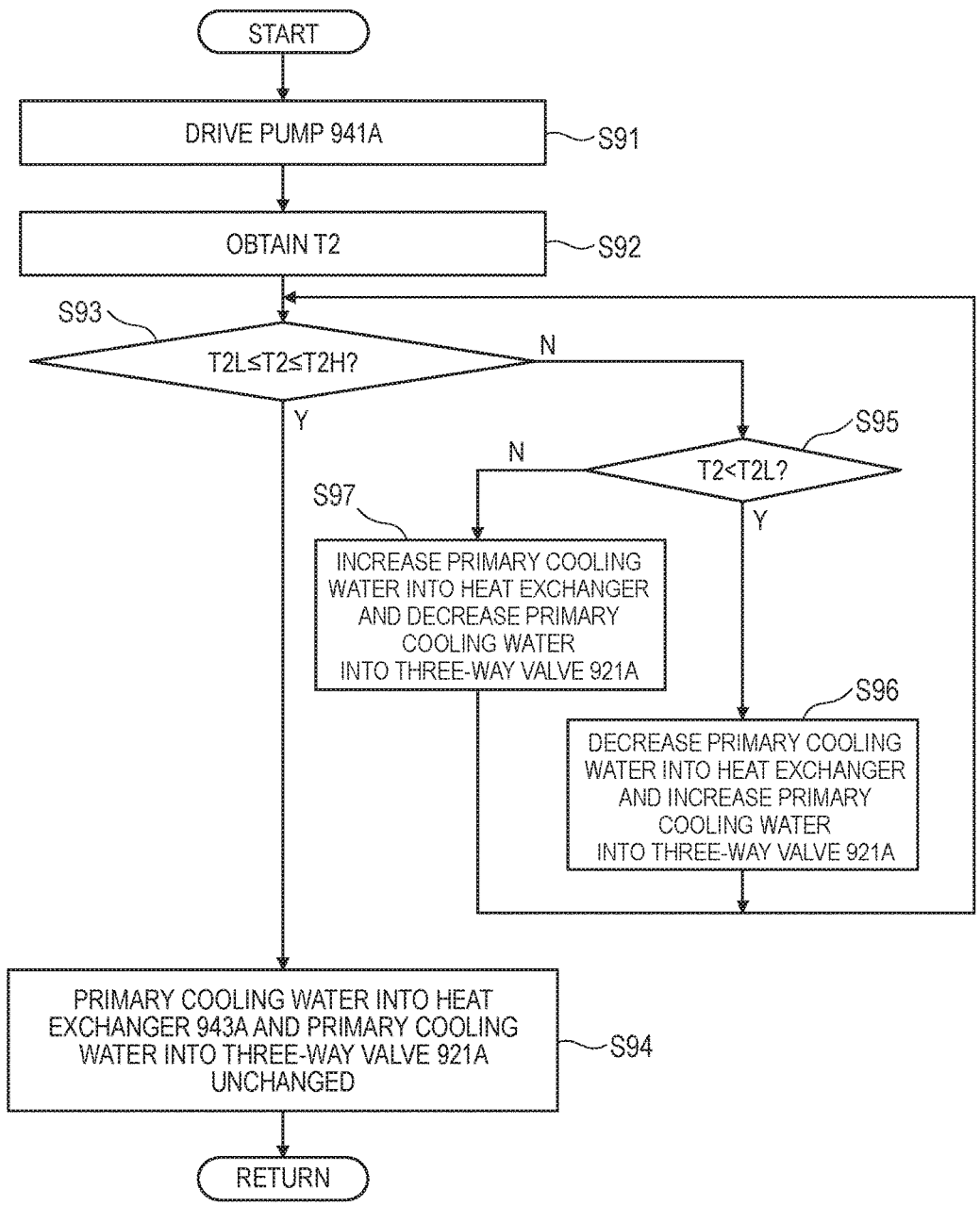
FIG. 16 is a flowchart showing a subroutine for controlling a temperature of primary cooling water by operating a three-way valve.

3.2.2.2.2 Temperature Control Process in Second Through Fifth Cooling Water Temperature Control Devices FIG. 13 is a flowchart showing a temperature control process in the second through fifth cooling water temperature control devices. FIG. 14 is a flowchart showing a subroutine for controlling a temperature of secondary cooling water with a heater. FIG. 15 schematically illustrates the second through fifth cooling water temperature control devices in operation during the temperature control process. FIG. 16 is a flowchart showing a subroutine for controlling a temperature of primary cooling water by operating a three-way valve.

Following the process shown in FIGS. 11 and 12, the controller 948A may carry out a subroutine to control the temperature of the secondary cooling water with the heater 934A (Step S61), as shown in FIG. 13. Through the process in Step S61, the temperature of the secondary cooling water circulating in the secondary cooling water circulation channel may be controlled to fall in a range from a lower limit temperature T2L to an upper limit temperature T2H inclusive. The temperature range is defined by the upper limit temperature T2H and the lower limit temperature T2L. A target temperature of the secondary cooling water, which is a median value, is, for example, 25° C. For example, the upper limit temperature T2H may be 25.1° C., and the lower limit temperature T2L may be 24.9° C.

More specifically, with reference to FIG. 14, the controller 948A may start the timer 947A to measure a time M3 (Step S71). The controller 948A may then control the three-way valve 921A to minimize the amount of primary cooling water 135 (see FIG. 15) supplied from the PCW supply unit 111 and flowing into the heat exchanger 943A (Step S72). Here, the controller 948A may send a signal to the three-way valve controller 925A to close a flow channel from the first inlet 922A to the outlet 923A and fully open a flow channel from the second inlet 924A to the outlet 923A. Thus, the secondary cooling water may be prevented from being cooled by the primary cooling water 135 while the temperature of the secondary cooling water is adjusted.

Then, the controller 948A may turn on the heater power supply 938A to start supplying power to the heater 934A (Step S73). Thus, the temperature of the secondary cooling water in the tank 927A may rise. Thereafter, the controller 948A may determine whether or not the time M3 has exceeded a time K3 set in advance (Step S74). The time K3 may be set to a time it takes for the temperature of the secondary cooling water in the tank 927A to rise to a temperature that falls within a range from the lower limit temperature T2L to the upper limit temperature T2H inclusive. When the controller 948A determines that the time M3 has not reached the time K3 (Step S74; NO), the controller 948A may repeat Step S74. When the controller 948A determines that the time M3 has exceeded the time K3 (Step S74; YES), the controller 948A may drive the pump 941A (Step S75) to circulate the secondary cooling water in the secondary cooling water circulation channel. Then, the temperature of the secondary cooling water may rise as the secondary cooling water passes through the tank 927A.

Thereafter, the controller 948A may determine a signal from the temperature sensor 946A to obtain a temperature T2 of the secondary cooling water (Step S76) and determine whether or not the temperature T2 falls within a range from the lower limit temperature T2L to the upper limit temperature T2H inclusive (Step S77). Here, the temperature of the secondary cooling water may rise by being heated with the heater 934A or through heat exchange between the first aluminum-containing portion 102 and the secondary cooling water while the secondary cooling water circulates in the secondary cooling water circulation channel.

When the controller 948A determines that the temperature T2 falls within a range from the lower limit temperature T2L to the upper limit temperature T2H inclusive (Step S77; YES), the controller 948A may turn off the heater power supply 938A (Step S78) to terminate the subroutine for controlling the temperature of the secondary cooling water with the heater 934A. When the controller 948A determines that the temperature T2 does not fall within a range from the lower limit temperature T2L to the upper limit temperature T2H inclusive (Step S77; NO), the controller 948A may then determine whether or not the temperature T2 falls below the lower limit temperature T2L (Step S79). When the controller 948A determines that the temperature T2 falls below the lower limit temperature T2L (Step S79; YES), the controller 948A may increase a current in the heater 934A to raise the temperature of the secondary cooling water (Step S80) and return to Step S77. When the controller 948A determines that the temperature T2 does not fall below the lower limit temperature T2L (Step S79; NO), the controller 948A may decrease a current in the heater 934A to lower the temperature of the secondary cooling water (Step S81) and return to Step S77. This is so because it can be considered that the temperature T2 exceeds the upper limit temperature T2H. Through the above-described process, the secondary cooling water whose temperature has been adjusted to a temperature within a range from the lower limit temperature T2L to the upper limit temperature T2H inclusive may be supplied to the first aluminum-containing portion 102.

Referring back to FIG. 13, the controller 948A may then carry out a subroutine for controlling the temperature of the primary cooling water by operating the three-way valve 921A (Step S62). Through the process in Step S62, heat exchange may be carried out between the secondary cooling water and the temperature-adjusted primary cooling water, and the temperature of the secondary cooling water may be adjusted. In turn, the temperature of the first aluminum-containing portion 102 may be controlled through heat exchange between the first aluminum-containing portion 102 and the temperature-adjusted secondary cooling water.

More specifically, with reference to FIG. 16, the controller 948A may drive the pump 941A (Step S91). Then, the controller 948A may obtain a temperature T2 of the secondary cooling water (Step S92) and determine whether or not the temperature T2 falls within a range from the lower limit temperature T2L to the upper limit temperature T2H inclusive (Step S93). When the controller 948A determines that the temperature T2 falls within a range from the lower limit temperature T2L to the upper limit temperature T2H inclusive (Step S93; YES), the controller 948A may terminate the subroutine without changing the amount of primary cooling water 135 (see FIG. 15) flowing into the heat exchanger 943A nor the amount of primary cooling water 136 (see FIG. 15) flowing into the three-way valve 921A through the pipe L18 (Step S94). Since the amount of primary cooling water 135 used to adjust the temperature of the secondary cooling water does not change through Step S94, the temperature of the secondary cooling water may be retained within a range from the lower limit temperature T2L to the upper limit temperature T2H inclusive.

When the controller 948A determines that the temperature T2 does not fall within a range from the lower limit temperature T2L to the upper limit temperature T2H inclusive (Step S93; NO), the controller 948A may then determine whether or not the temperature T2 falls below the lower limit temperature T2L (Step S95). When the controller 948A determines that the temperature T2 falls below the lower limit temperature T2L (Step S95; YES), the controller 948A may control the three-way valve 921A to adjust the ratio of primary cooling water 135 flowing into the heat exchanger 943A to the primary cooling water 136 flowing into the three-way valve 921A (Step S96, i.e., decrease the primary cooling water 135 and increase the primary cooling water 136), and return to Step S93. Accordingly, cooling performance of the heat exchanger 943A to cool the secondary cooling water may decrease. As a result, the temperature of the secondary cooling water may rise.

When the controller 948A determines that the temperature T2 does not fall below the lower limit temperature T2L (Step S95; NO), the controller 948A may adjust the ratio of the primary cooling water 135 flowing into the heat exchanger 943A to the primary cooling water 136 flowing into the three-way valve 921A (Step S97, i.e., increase the primary cooling water 135 and decrease the primary cooling water 136), and return to Step S93. It can be considered that the temperature T2 exceeds the upper limit temperature T2H. Accordingly, cooling performance of the heat exchanger 943A to cool the secondary cooling water may increase. As a result, the temperature of the secondary cooling water may fall. Through the above-described process, the secondary cooling water whose temperature has been adjusted to a temperature within a range from the lower limit temperature T2L to the upper limit temperature T2H inclusive may be supplied to the first aluminum-containing portion 102.

Referring back to FIG. 13, the controller 948A may then determine whether or not the control of the temperature of the first aluminum-containing portion 102 using the secondary cooling water is to be terminated (Step S63). When the controller 948A determines that the control is not to be terminated (Step S63; NO), the controller 948A may return to Step S62. When the controller 948A determines that the control is to be terminated (Step S63; YES), the process in this flowchart may be terminated.

A process similar to the above-described process may also be carried out in the third cooling water temperature control device 960A using ordinary water as the secondary cooling water to control the temperature of the first copper-containing portion 103. Further, a process similar to the above-described process may be carried out in the fourth and fifth cooling water temperature control devices 920B and 960B using super pure water as the secondary cooling water to control the temperature of the second aluminum-containing portion 105 and the second copper-containing portion 106, respectively. In each of the fourth and fifth cooling water temperature control devices 920B and 960B, bubbling with inert gas by the bubble generators 935B and 975B may be started prior to Step S61, and the bubbling may be terminated after Step S63. A timing to start or end the bubbling may be at any timing while the temperature control process is carried out.

With the above-described configuration and operation, the secondary cooling water circulation channel can be filled with the secondary cooling water using the tank 927A whose volume is relatively small compared to a typical chiller. Thus, the tank 927A can be reduced in size and in turn the entire device may be reduced in size.

Further, a time it takes for temperature of the secondary cooling water to reach a desired temperature may be reduced. In addition, by adjusting the ratio of the primary cooling water 135 to the primary cooling water 136, cooling performance of the heat exchanger 943A can be fine-tuned. Accordingly, the temperature of the secondary cooling water can be fine-tuned using the heat exchanger 943A. Thus, a time it takes for the temperature of the first aluminum-containing portion 102 to stabilize may be reduced.

Here, in the second and third cooling water temperature control devices 920A and 960A, super pure water may be used in place of ordinary water as the secondary cooling water. Further, the heater 909A and the heater power supply 910A may not need to be provided in the first cooling water temperature control device 900A.

3.3 Second Embodiment

3.3.1 Configuration

Figure 17:
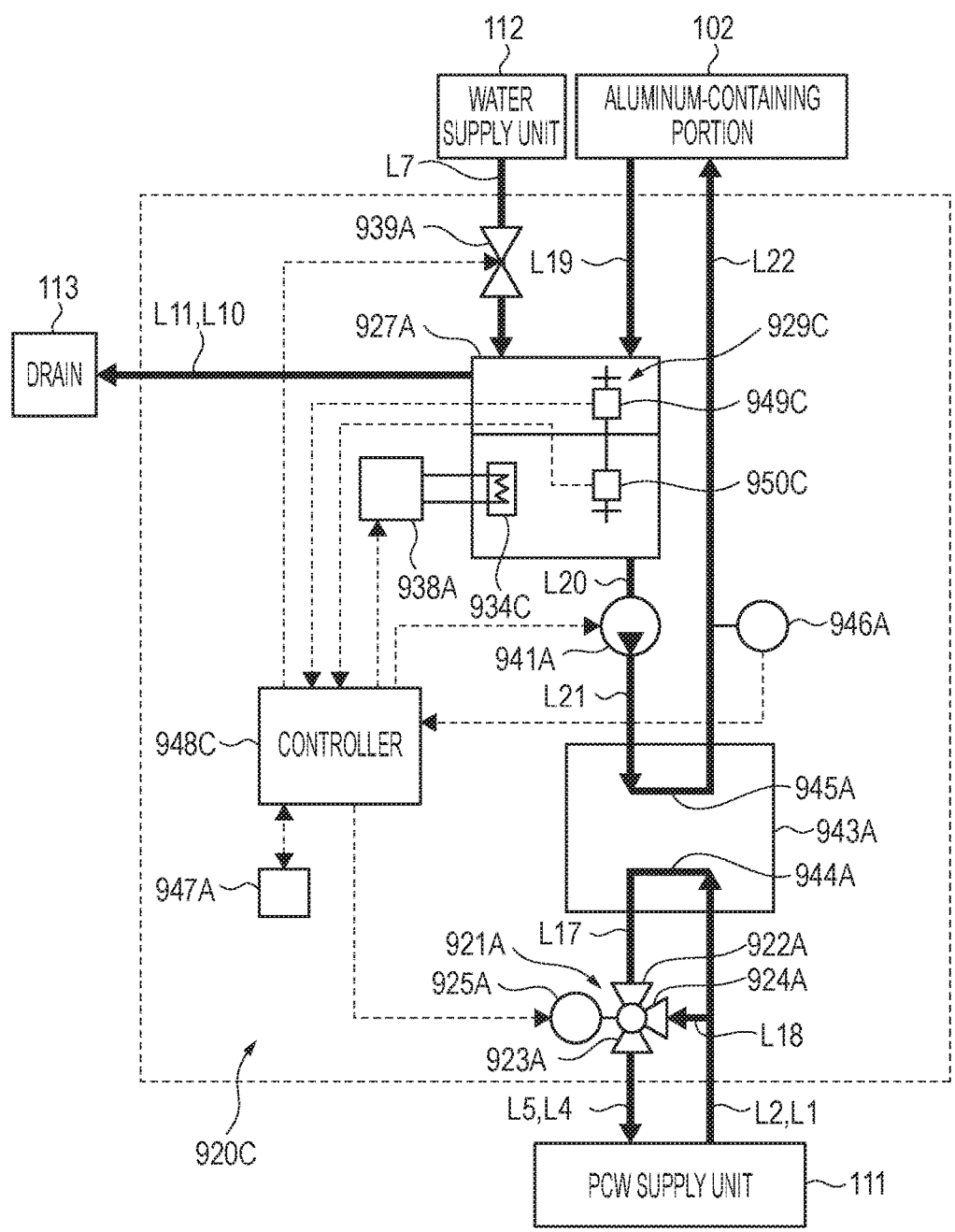
FIG. 17 schematically illustrates an exemplary configuration of a circulation adjuster of a cooling water temperature control device according to a second embodiment of the present disclosure.

FIG. 17 schematically illustrates an exemplary configuration of a circulation adjuster in a cooling water temperature control device according to a second embodiment of the present disclosure. With reference to FIG. 17, a circulation adjuster 929C in a second cooling water temperature control device 920C of the second embodiment may differ from the circulation adjuster 929A of the first embodiment in that the circulation adjuster 929C does not include the cylinder 930A, the float 931A, the upper limit switch 932A, the lower limit switch 933A, the heater 934A, and the controller 948A, and in that the circulation adjuster 929C includes a heater 934C, a controller 948C, an upper limit detection sensor 949C serving as a fluid level detection unit, and a lower limit detection sensor 950C serving as a fluid level detection unit. The heater 934C may be connected to the heater power supply 938A. The upper limit detection sensor 949C may be provided in an upper half portion of the tank 927A. The lower limit detection sensor 950C may be provided in a lower half portion of the tank 927A. Each of the upper limit detection sensor 949C and the lower limit detection sensor 950C may be connected to the controller 948C. The upper limit detection sensor 949C and the lower limit detection sensor 950C may detect when the secondary cooling water comes into contact thereto and send a contact detection signal to the controller 948C.

When the controller 948C receives contact detection signals from both the upper limit detection sensor 949C and the lower limit detection sensor 950C, the controller 948C may determine that the fluid level of the secondary cooling water in the tank 927A has reached the upper limit. When the controller 948C receives a contact detection signal only from the lower limit detection sensor 950C, the controller 948C may determine that the fluid level of the secondary cooling water in the tank 927A is located between the upper limit and the lower limit. When the controller 948C does not receive a contact detection signal from either the upper limit detection sensor 949C or the lower limit detection sensor 950C, the controller 948C may determine that the fluid level of the secondary cooling water in the tank 927A has fell below the lower limit.

The controller 948C may carry out processes similar to those shown in FIGS. 11 through 14 and 16. Here, the configuration shown in FIG. 17 may be adopted in the first embodiment as well instead of those of the circulation adjusters 929A, 969A, 929B, and 969B.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A device for controlling a temperature of cooling water, the device comprising:
   a heat exchanger for carrying out heat exchange between primary cooling water and secondary cooling water;
   a tank for storing the secondary cooling water;
   an injection pipe for connecting between the tank and a secondary cooling water supply unit;
   a valve for controlling a flow rate of the secondary cooling water to be supplied into the tank from the secondary cooling water supply unit through the injection pipe;
   a fluid level detection unit for detecting an amount of the secondary cooling water stored in the tank;
   a first circulation pipe for connecting between the tank and a secondary cooling water inlet of the heat exchanger;
   a second circulation pipe for connecting between a secondary cooling water outlet of the heat exchanger and a secondary cooling water inlet of a temperature-control target;
   a third circulation pipe for connecting between the tank and a secondary cooling water outlet of the temperature-control target;
   a pump for circulating the secondary cooling water stored in the tank through the heat exchanger, the temperature-control target, and the tank; and
   a controller for opening the valve while operation of the pump is stopped, closing the valve and driving the pump in the case that detection results from the fluid level detection unit indicate an upper limit amount, and stopping the operation of the pump in the case that the detection results from the fluid level detection unit indicate a lower limit amount.

2. A device for controlling a temperature of cooling water as defined in claim 1, further comprising:
   a nitrogen introduction unit for introducing nitrogen gas into secondary water stored in the tank.

3. A device for controlling a temperature of cooling water as defined in claim 2, wherein:

the nitrogen introducing unit comprises a bubble generating distal end portion constituted by a porous member;

nitrogen is introduced into the secondary cooling water within the tank through the pores of the bubble generating distal end portion by nitrogen being supplied to the nitrogen introducing unit, to generate nitrogen gas bubbles within the secondary cooling water within the tank, to decrease the concentration of dissolved oxygen in the secondary cooling water within the tank.

4. A device for controlling a temperature of cooling water as defined in claim 3, wherein:

the tank comprises a plate provided between the bubble generating distal end portion and a connecting portion of the first circulating pipe connected to the tank, for preventing nitrogen gas bubbles, which are generated in the secondary cooling water within the tank through the bubble generating distal end portion, from moving toward the side of the connecting portion of the first circulating pipe.

5. A device for controlling a temperature of cooling water as defined in claim 1, wherein:

the controller closes the valve and drives the pump, and stops driving of the pump when an elapsed time after driving of the pump is initiated, measured by a timer, exceeds a set amount of time which is set in advance, without the fluid level detection unit detecting a lower limit value.

6. A device for controlling a temperature of cooling water as defined in claim 1, wherein:

the fluid level detecting unit is a cylindrical member that extends in the vertical direction and is fixed to the tank, and comprises the cylindrical member that enables secondary cooling water which is introduced into the tank to flow thereinto, an upper limit limit switch positioned at an upper portion of the cylindrical member, a lower limit switch positioned at a lower portion of the cylindrical member, and a float having buoyancy capable of moving in an upward direction and the downward direction in the vertical direction along the cylindrical member according to changes in the water level of secondary cooling water;

the upper limit switch sends a signal indicating that the secondary cooling water has reached an upper limit amount to the controller when it is detected that the float has moved upward to a predetermined upper limit height, and the lower limit switch sends a signal indicating that the secondary cooling water has reached a lower limit amount to the controller when it is detected that the float has moved downward to a predetermined lower limit height.

7. A device for controlling a temperature of cooling water as defined in claim 1, wherein:

the tank is connected to a drain pipe in the vicinity of the upper end of the side surface of the tank.

8. A device for controlling a temperature of cooling water as defined in claim 1, wherein:

the first circulating pipe is connected to the bottom surface of the tank.

9. A device for controlling a temperature of cooling water as defined in claim 1, wherein:

a butterfly valve is provided with the third circulating pipe.

10. A device for controlling a temperature of cooling water as defined in claim 1, wherein:

a filter is provided in the first circulating pipe.

11. A device for controlling a temperature of cooling water as defined in claim 1, wherein:

the heat exchanger is a plate type heat exchanger.

\* \* \* \* \*